United States Patent
Duby et al.

(10) Patent No.: US 10,416,436 B2
(45) Date of Patent: Sep. 17, 2019

(54) ADVANCEMENTS IN REFLECTIVE MONOCULAR, BINOCULAR, AND NIGHT VISION APPLICATIONS INCLUDING MULTI-WAVE

(71) Applicants: Dante Duby, El Cajon, CA (US); Devon Duby, El Cajon, CA (US)

(72) Inventors: Dante Duby, El Cajon, CA (US); Devon Duby, El Cajon, CA (US)

( * ) Notice: Subject to any disclaimer, the term of this patent is extended or adjusted under 35 U.S.C. 154(b) by 0 days.

(21) Appl. No.: 15/483,152

(22) Filed: Apr. 10, 2017

(65) Prior Publication Data

US 2018/0292639 A1    Oct. 11, 2018

Related U.S. Application Data

(60) Provisional application No. 62/321,105, filed on Apr. 11, 2016.

(51) Int. Cl.
| | |
|---|---|
| *G02B 23/02* | (2006.01) |
| *G02B 23/12* | (2006.01) |
| *G02B 23/18* | (2006.01) |
| *G02B 27/10* | (2006.01) |

(52) U.S. Cl.
CPC ............. *G02B 23/12* (2013.01); *G02B 23/02* (2013.01); *G02B 23/125* (2013.01); *G02B 23/18* (2013.01); *G02B 27/1066* (2013.01)

(58) Field of Classification Search
None
See application file for complete search history.

(56) References Cited

U.S. PATENT DOCUMENTS

| 2,633,122 | A | * | 3/1953 | Vannas | A61B 3/1208 351/205 |
|---|---|---|---|---|---|
| 4,266,849 | A | * | 5/1981 | Warner | G02B 5/122 359/364 |
| 4,444,474 | A | * | 4/1984 | Pasko | G02B 23/06 359/364 |
| 4,746,798 | A | * | 5/1988 | Amon | G01J 3/12 250/339.02 |
| 5,132,836 | A | * | 7/1992 | Fundingsland | G02B 7/1821 359/364 |
| 5,699,341 | A | * | 12/1997 | Sugi | G11B 7/1376 369/112.24 |

(Continued)

*Primary Examiner* — Charlie Y Peng

(57) ABSTRACT

A correct image reflecting monocular/telescope, with apparent straight through the device seeing, well suited for telescope, binocular, or goggle applications, including low profile single-wave and multi-wave night vision devices; comprised of at least one flat mirror, one of which having a central aperture, a concave primary mirror, and an image correcting system with offset angle viewing. The flat mirror with central aperture reflects the incoming light from the monocular aperture into other flat mirrors or directly into the concave primary mirror. The converging reflected light from the primary mirror passes back through the small central opening in the flat aperture mirror and into an image correcting system. The image correcting system upright corrects and deflects the focal image of the primary mirror by an offset angle behind the flat aperture mirror for observation with an eyepiece or other means, making it useful in both terrestrial as well as celestial applications.

18 Claims, 11 Drawing Sheets

(56) References Cited

U.S. PATENT DOCUMENTS

| | | | |
|---|---|---|---|
| 6,888,672 B2* | 5/2005 | Wise | G02B 17/08 |
| | | | 359/364 |
| 2004/0021938 A1* | 2/2004 | Filipovich | G02B 23/12 |
| | | | 359/409 |
| 2008/0037115 A1* | 2/2008 | Duby | G02B 17/08 |
| | | | 359/399 |
| 2009/0041292 A1* | 2/2009 | Daly | G01V 8/005 |
| | | | 382/100 |
| 2009/0263115 A1* | 10/2009 | Suzuki | A61B 3/12 |
| | | | 396/18 |
| 2015/0022884 A1* | 1/2015 | Hakel | G02B 23/145 |
| | | | 359/422 |

* cited by examiner

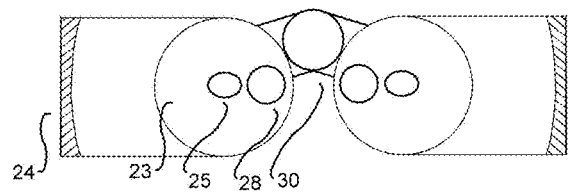
FIG.3d
(Front/Back)
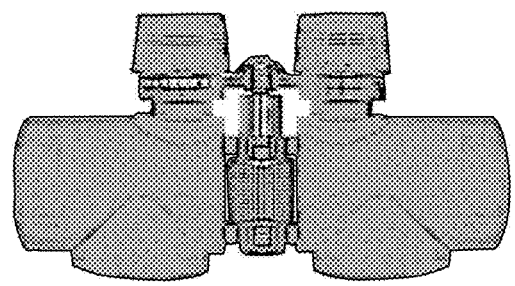
FIG.3e (Top)
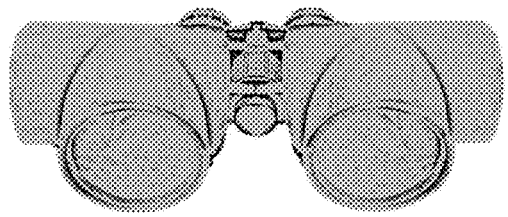
(Front)

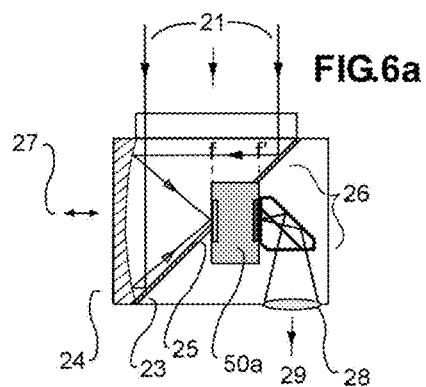
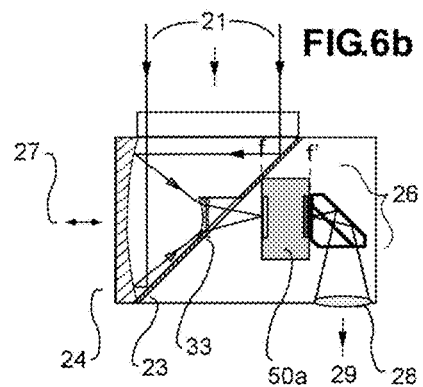
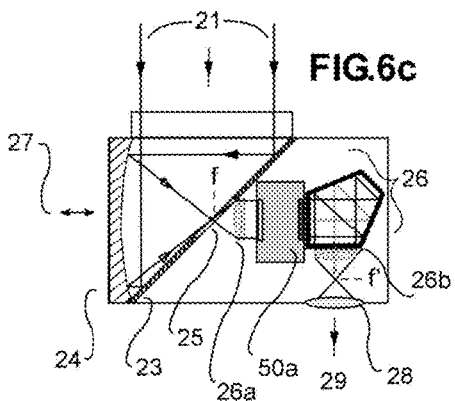
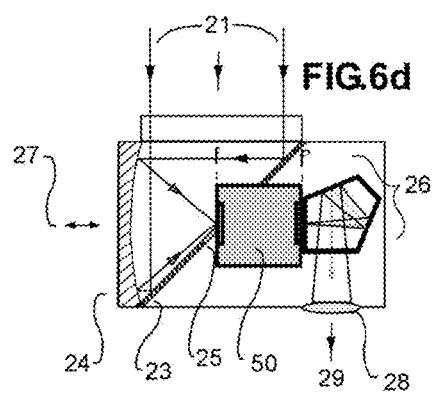
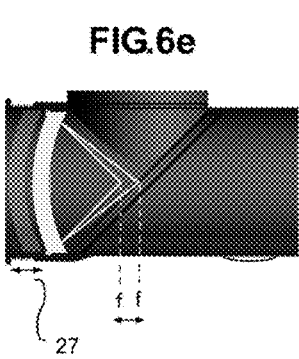
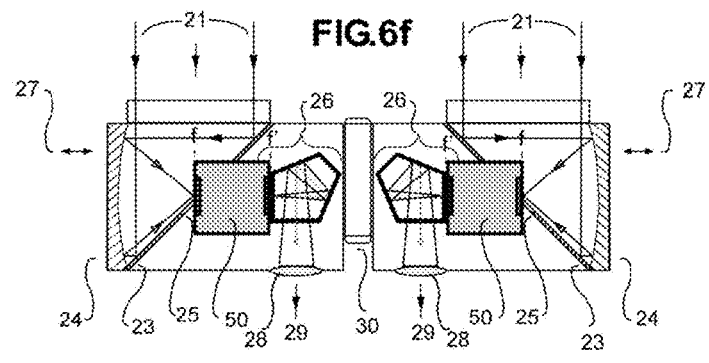

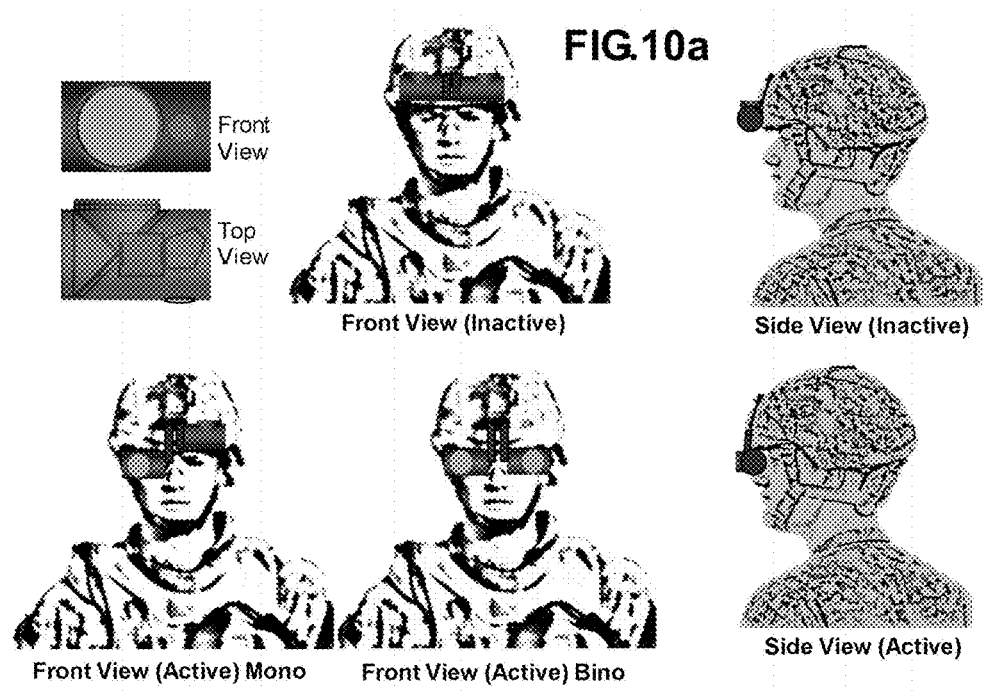
FIG. 10a
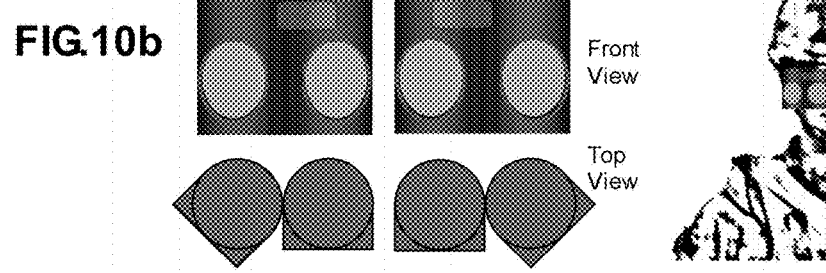
FIG. 10b
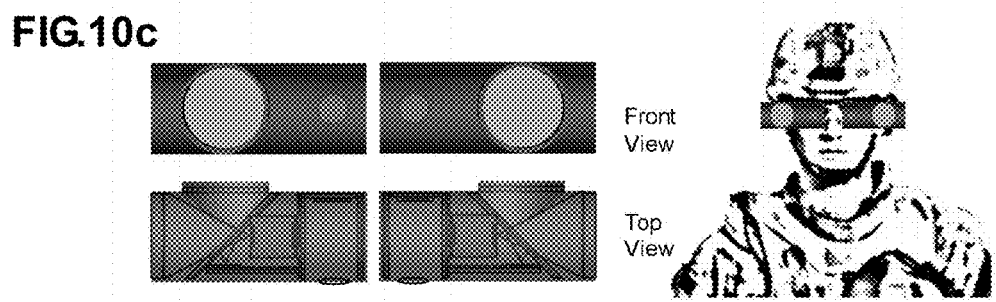
FIG. 10c

ADVANCEMENTS IN REFLECTIVE MONOCULAR, BINOCULAR, AND NIGHT VISION APPLICATIONS INCLUDING MULTI-WAVE

This application claims the benefit of provisional application 62/321,105, filed on Apr. 11, 2016.

BACKGROUND OF THE INVENTION

The present invention relates to monocular and binocular configurations used in both terrestrial and astronomical applications, including both single-wave and multi-wave night vision; more specifically to an improved version of reflective monocular/telescope which can be arranged in a number of configurations to facilitate unique and useful applications.

One object of the invention when used in higher magnifications is to improve the optical performance of a reflecting monocular telescope over that of the Newtonian, Cassegrain, Gregorian, Maksutov and Schmidt-Cassegrain types. This optical advantage results from improved diffraction performance, since those other reflective telescope types all involve putting a secondary mirror into the optical path which causes diffraction into the optical path, whereas the present invention uses a hole in the optical path which diffracts light away from the optical path, thus yielding better contrast performance. Additionally, the present invention typically blocks less of the incoming light because the hole in the optical path will often be smaller than the reflective element used in the optical path of competing reflective designs.

Another object of the invention is to enhance the usefulness of a reflecting telescope design by incorporating image correcting optics into the design. This allows the telescope to be used for terrestrial as well as celestial observation at a reduced cost. The advantage of this is most apparent when compared to the Newtonian type of telescope which generally cannot be used for terrestrial observation even with external correctors. That is because the image Newtonians create is rotated at some angle dependent on the eyepiece location in addition to being inverted. The other types of reflecting telescopes can have their images corrected, but they require additional external optical components to do it.

Another object of the invention is to achieve a lower cost compared to most other telescope designs. This advantage can be achieved by first using elementary optics rather than custom components, or components requiring specially shaped optical pairs to eliminate aberrations. And second, by reducing the precision requirements of the secondary mirror compared to the other telescopes mentioned.

Another object of the invention is to create a reflecting telescope design that is rugged enough to remain collimated after being set at a factory. The advantage of this is most apparent when compared to the Newtonian design which generally requires collimation with each use, particularly when transported, to maintain optimum performance. The very stable design structure of the present invention makes it useful as a spotting type field telescope, rifle scope, spy-scope, binocular, or goggle, which generally cannot be done effectively using other reflective type telescope designs.

Another object of the invention is to provide a reflective monocular which can be used in a rifle scope applications which doesn't require an optic at the scope forward opening which might reflect sunlight and possibly give away a users position as would be the case with other reflective designs.

Another object of the invention is to provide an improved reflective monocular which can readily be used to form binoculars of any size, which will directly compete with refractive designs due to the many advantages the configuration provides, including the ability to build aperture sizes well beyond what is practical for refractive instruments. This isn't even an option for nearly all other reflective designs which is why refractive designs dominate the marketplace.

Another object of the invention is to provide a forward looking binocular in a compact configuration. Competitors typically use Newtonian telescopes, which are often reverse direction, pointing backward from the direction the observer is looking, and not at all compact.

Another object of the invention is to create a reflecting binocular design that is rugged enough to remain collimated after being set at a factory. The advantage of this over all other reflective designs, Newtonians in particular, allows for it to be used in field applications for both military and commercial applications. The very stable design structure of the present invention is nearly unmatchable by other reflective designs.

Another object of the invention is to provide an improved reflective monocular which can be rotated or tilted without affecting the orientation of the optical image such that when used in a binocular or goggle configuration interpupillary distance spacing can be achieved by rotating the monoculars inward, toward each other, in a similar way as that of refractive binocular designs. This is not currently possible with most other reflective binocular approaches which typically connect a pair of Newtonian reflectors which rotate the image when the monocular tubes are rotated or tilted.

Another object of the invention is to provide monocular and binocular configurations which have a center of geometry and weight distribution much closer to the observer's body, thus providing low profile instruments which are easier to handle, even in larger configurations normally requiring separate mounts. Thus larger objective instruments may be hand held while competitive instruments require mounting. This also allows for an instrument of comparable aperture to be held steadier and for longer periods of time, particularly if the reflective optics can be made lighter weight than refractive competitive designs. The present invention therefore has a low profile advantage over all other refractive and reflective designs.

Another object of the invention is to provide monocular and binocular telescope configurations which incorporate the folding of optics in such a way that very large objective instruments can be made in much smaller total package sizes than competitive designs, making them much more portable, user friendly and attractive for consumers.

Another object of the invention is to provide a large aperture binocular configuration which can exceed the performance capability of refractive designs by using a scalable body design which allows the optical elements to be sized much larger than is practical with refractive designs while still being compact enough to be considered user friendly or mobile.

Another object of the invention is to provide an improved reflective monocular which can readily be used in night vision applications which can provide superior handling performance due to their very low profiles, while matching or exceeding optical performance. This isn't even an option for most other reflective designs which not only block too much light, but are configured in ways which are inferior to refractive approaches. This is why refractive designs dominate the marketplace.

Another object of the invention is to provide a monocular or goggle configuration for night vision applications which has a center of geometry and weight distribution much closer to the observer's body thus providing an extremely low profile instrument compared to refractive designs, which is easier to handle in tactical situations requiring rapid or abrupt movements. This advantage is improved further if the reflective optics can be made lighter weight than refractive competitive designs. This advantage makes the present invention superior in many respects to refractive design competitors and no other reflective designs are even applicable to compete.

Another object of the invention is to provide a multi-wave capability for night vision applications with a common reflective monocular optical path. This design approach is superior to refractive design approaches which use separate optical paths for each wavelength of light and then combine them, often with ghosting visual effects. Additionally, the use of common reflective elements can improve performance since a wide range of wavelengths reflect off mirrors by the same amount and therefore converge to a common point, whereas they do not converge to the same point through refractive optics (chromatic aberration).

Another object of the invention is to provide a telescope configuration which can effectively be used in applications with liquid mirrors which form into parabolic shapes when spun. The configuration allows for the primary liquid optic to remain spinning in a horizontal orientation while also accommodating focal length changes when the primary optic rotational speeds are changed. The configuration would allow for full 360 views of the night sky from a large liquid primary parabolic mirror.

These and other objects and advantages of the present invention will become increasingly apparent upon consideration of the drawings and ensuing description.

PRIOR ART

The prior art, in all cases where a reflected cone of light from a concave mirror passes through an aperture in a flat mirror, has the focal point of the light cone pass through the aperture in the flat mirror to a point directly behind the mirror and on the same optical axis as the primary mirror and viewing system. They don't even consider redirecting that light cone on the backside of the flat mirror for special purposes. The light cone and focal point of the concave mirror never even pass through the aperture in the flat mirror of my previous U.S. Pat. No. 7,403,331, since the goal was to minimize the blockage of light by making the hole in the flat mirror as small as possible; so the focal point is nearly coincident to the front surface of the hole in the flat aperture mirror. That was not a goal of the present invention and therefore the light cone and focal point of the primary mirror is considered from the coincident point of my previous invention back through the hole to different points behind the flat aperture mirror, depending on the needs of the device being built; where it can either be redirected such that light coming into the instrument is directly in line, parallel, to the light going out at the observation point; for the purpose of making the shortest monocular possible, which can then be used in telescope, binocular, and goggle applications, for terrestrial, astronomical, and night vision use, including multi-wave night vision; or it could be deflected at some other angle for some other purpose. The present invention is therefore capable of being used in many more useful applications.

The next most closely related prior art patents to the present invention are: U.S. Pat. No. 5,132,836 issued to Fundingsland, U.S. Pat. No. 4,444,474 issued to Pasko, and U.S. Pat. No. 4,221,459 issued to Fisher.

Further consideration of these also shows in the case of the Fundingsland design an external finder scope is not practical so a second concave mirror is used between its main concave mirror and its flat aperture mirror for this purpose. This mirror is then folded down after use. The addition of the second concave mirror makes the design more complex and increases cost. In addition, the Fundingsland telescope, by virtue of design, is a completely open optical system which permits stray light to affect optical performance. And, it would require a separate image correcting element for terrestrial use. The present invention can be completely sealed, when using an optical window in the telescope aperture, no finder scope would be needed in terrestrial cases as the incoming light is directly in line with the outgoing light as is the case in traditional spy scopes and binoculars, and the image correcting optics are intrinsic to the design. Additionally the Fundingsland design could never be used as a night vision monocular or goggle because the design precludes it by its very structure and doesn't even allow for straight-through the device seeing.

In the case of the Pasko design, an external finder scope mounts to an upper turret. And, since this upper turret can rotate and be tilted in nearly any direction, so too would the finder scope, making it difficult to use if pointing straight up or backwards. The rotating turret design adds to the complexity of the telescope in addition to requiring a third mirror, both of which add to the cost. Furthermore, the Pasko design requires and external image corrector for terrestrial use. Since the present invention often doesn't need a finder scope or an external image corrector, the costs are further reduced accordingly. Additionally the Pasko design could never be used as a night vision monocular or goggle because the design precludes it by its very structure and doesn't even allow for straight-through the device seeing.

Although Fisher does incorporate and angle into his design, that angle occurs before light ever strikes the flat mirror, not after passing though it; therefore, it cannot be used in many applications of the present invention. Light passing through the hole in the flat mirror is on the same optical axis as the concave primary mirror and viewing systems as noted previously. Also, in the Fisher design, light passes through an objective lens before striking the flat mirror and concave mirror, requiring those mirrors to be more precise and therefore more expensive. Additionally the Fisher design could never be used as a night vision monocular or goggle because the design precludes it by its angled structure and doesn't even allow the possibility for straight-through the device seeing.

SUMMARY OF THE INVENTION

The present invention is a reflecting monocular which redirects viewing by 90° such that apparent straight-through the optics, correct upright image viewing is possible with a reflective instrument.

It is comprised of a flat mirror, a concave primary mirror, and an image correcting system located behind the flat mirror. The flat mirror reflects the incoming light from the telescope aperture into the concave primary mirror. The reflected light from the primary mirror passes back through a small centrally located opening in the flat aperture mirror and into an image correcting system. The image correcting system upright corrects the image while redirecting it by 90° for viewing with an eyepiece in line with the incoming light. All variations of the monocular are useful in binocular configurations.

An expanded version of the design folds the optical path with additional flat mirrors to provide unique monocular telescopes and large aperture binoculars capable of very large apertures, which have no comparison to existing products in refractive or reflective designs.

When used in night-vision applications the present invention can exceed current capabilities of most other devices, especially when considering multi-wave applications, while offering such in a lower profile package than competitive refractive designs.

DESCRIPTION OF THE DRAWINGS

FIG. 2a shows a shortened version of the monocular/telescope of FIG. 1a.

FIG. 3d shows the binoculars of FIG. 3a, 3b, 3c adjusting for interpupillary distance.

FIG. 3e shows the binoculars of FIG. 3a, 3b, 3c fully assembled, in 3-dimensional view.

FIG. 4aa shows a binocular configuration consisting of the monocular of FIG. 4a, with ability to control interpupillary distance spacing.

FIG. 6a shows a monocular similar to that of FIG. 1a or 2a, used in a night vision application, with a non-inverting image intensifier inserted just prior to the 90° image corrector, where the focal point of the primary mirror is focused directly on the input of the image intensifier.

FIG. 6b shows the monocular similar to that of FIG. 1b, used in a night vision application, with a non-inverting image intensifier forming a portion of the 90° image corrector, using the diverging lens to extend the focal length of the primary mirror through the flat aperture mirror to the input of the image intensifier.

FIG. 6c shows the monocular of FIG. 1c, used in a night vision application, with a non-inverting image intensifier forming a portion of the 90° image corrector.

FIG. 6d shows a monocular similar to that of FIG. 1c, used in a night vision application, like FIG. 6c, with an inverting (upright image correcting) image intensifier forming a portion of the 90° image corrector rather than using the converging lenses, where the focal point of the primary mirror is focused directly on the input of the image intensifier.

FIG. 6e shows the focus adjustment for night vision monoculars of FIG. 6a, 6b, 6c, 6d.

FIG. 6f shows a binocular/goggle using the night vision monocular of FIG. 6d.

FIG. 10a shows how the night vision monoculars of FIG. 6a, 6b, 6c, 6d and binocular/goggle of FIG. 6f can be mounted in a low profile implementation for use by military with both active and inactive modes shown.

FIG. 10b shows how night vision monoculars of FIG. 6a, 6b, 6c, 6d, or multi-wave monoculars of FIG. 9, 9a can be combined for extended field of view.

FIG. 10c show how the multi-wave night vision monoculars of FIG. 9, 9a can be combined into a binocular/goggle and mounted in a low profile configuration for use by a soldier.

DETAILED DESCRIPTION OF THE PREFERRED EMBODIMENT

Figure 1A:
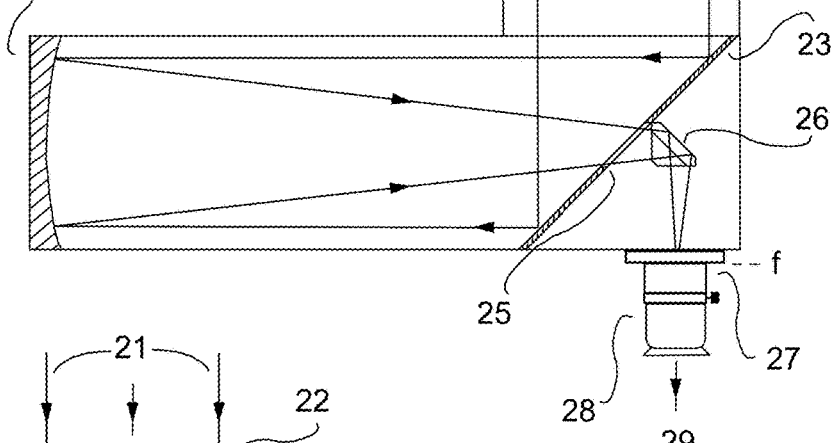
FIG. 1a shows a sectional view of a monocular/telescope consisting of a flat aperture mirror with a central hole, a concave primary mirror, and a 90° image corrector located behind the flat aperture mirror, with light paths indicated by arrows.

Referring to the drawings for a more detailed explanation of the preferred form of the invention, FIG. 1a shows the basic concept of the monocular of the invention. Light 21 entering the aperture of the telescope 22 reflects off the flat aperture mirror 23 which redirects the light into the concave primary mirror 24. The light reflects off the primary mirror 24 and back through a small centrally located opening 25 in the flat aperture mirror 23. The focal point of this light f is behind the flat aperture mirror 23. The light passes through the flat aperture mirror 23 and into the 90° image correcting system 26. After passing through the image correcting system, the image is upright correct and true and the focal point of the primary mirror 24 is now parallel to the incoming light, and within the range for focusing, which allows for "straight-through" seeing. This is significant as many useful applications depend on this orientation. In addition to monocular telescopes, straight through reflective binoculars are then possible, as well as drastically improved low profile configurations for night vision. All mirrors of the present invention are first surface coated mirrors as would be expected.

Figure 1B:
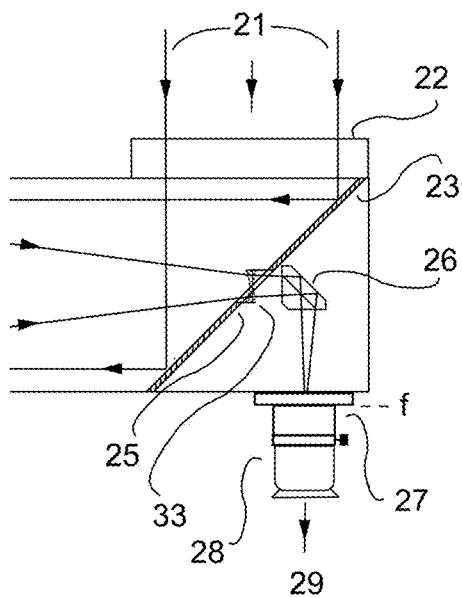
FIG. 1b shows a partial sectional view of a monocular/telescope similar to FIG. 1a, consisting of a flat aperture mirror with a smaller central hole, a diverging lens in that central hole, a concave primary mirror (not shown), and a 90° image corrector located behind the flat aperture mirror, with light paths indicated by arrows.

FIG. 1b shows a portion of a very similar monocular configuration to FIG. 1a, with only the primary mirror 24 not shown. It highlights an added element 33 which is a diverging lens. The purpose of this lens is to extend the focal point farther beyond the flat aperture mirror 23 without increasing the size of the opening 25 in that mirror, as well as reducing any diffraction effects of passing through the hole 25. In fact, the opening 25 can be made smaller, reducing the amount of light lost. So in this version, the light actually passes through a diverging lens in mirror 23, rather than just a hole in the mirror. This version uses a similar 90° image correcting system 26 to guide the corrected image into the focuser range behind the aperture mirror 23; again providing straight-through the device seeing for the observer.

Figure 1C:
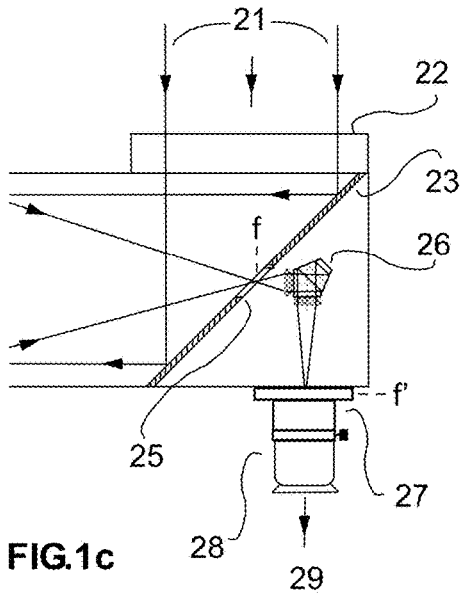
FIG. 1c shows a partial sectional view of a monocular/telescope similar to FIG. 1a, consisting of a flat aperture mirror with a smaller central hole, a concave primary mirror (not shown), using an image correcting means which takes the focal point of the primary mirror located near the central hole in the flat aperture mirror, and upright corrects and offsets the image by 90° for viewing by the observer behind the flat aperture mirror, with light paths indicated by arrows.

FIG. 1c shows a portion of another very similar monocular configuration to FIG. 1a, with only the primary mirror 24 not shown. It highlights a modified image corrector which can accept the focal point of the primary just behind the hole in the flat aperture mirror 23. With this approach, the opening 25 can be made smaller, reducing the amount of light lost. This version uses this different 90° image correcting system 26 to guide the corrected image into the focuser range behind the aperture mirror 23; again providing straight-through the device seeing for the observer.

These monocular designs represent a very stable structure, which can withstand greater mechanical shock to the system than other reflective designs, without needing realignment of the optics due to the fact the mirrors can be locked into place against the very structure of the telescope, which can contact the mirrors on all sides.

Figure 2A:
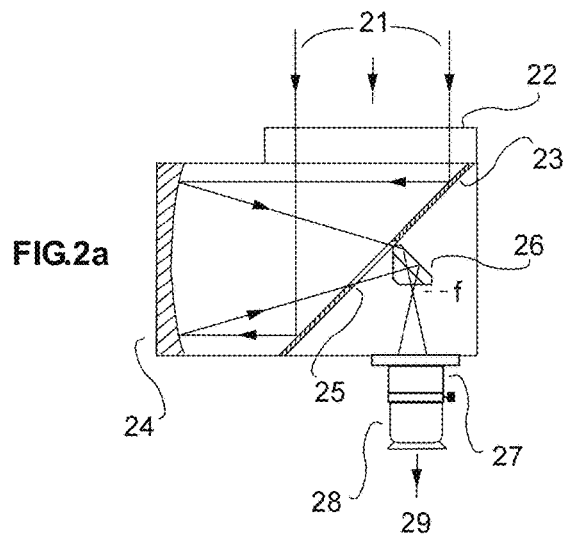

FIG. 2a shows the same monocular of FIG. 1a except with a much faster primary mirror 24 (shorter focal length, lower F#), the purpose being to reduce the size of the instrument as much as possible to allow it to be used in a more practical length binocular configuration.

Figure 2B:
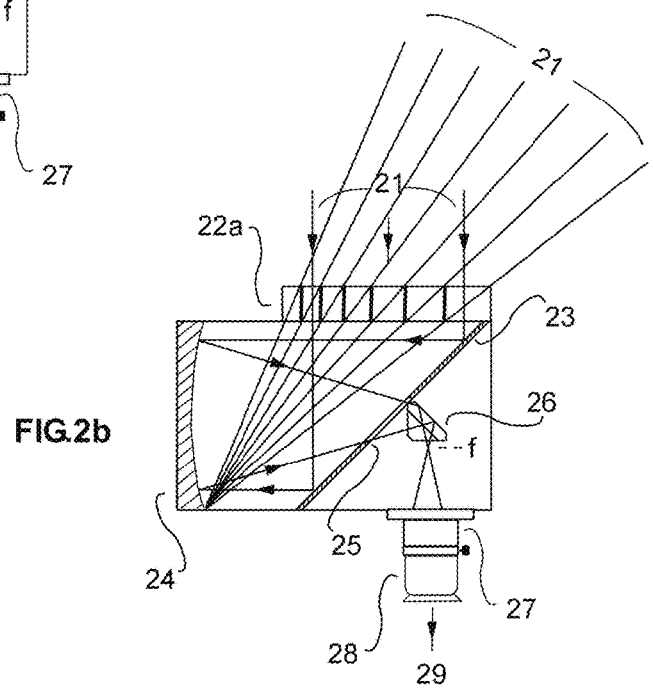
FIG. 2b shows the monocular/telescope of FIG. 2a with light baffling added.

FIG. 2b shows an improvement to the design of FIG. 2a by adding light baffles at the input of the instrument 22a to reduce stray light within the device. Light 21 entering from an angle will strike the baffles in the entryway 22a, which prevent those rays from reaching the primary mirror 24; therefore, only light rays which are capable of reflecting off the primary and passing through the central hole in the flat aperture mirror 25 are allowed into the instrument, reducing stray lighting.

Figure 2C:
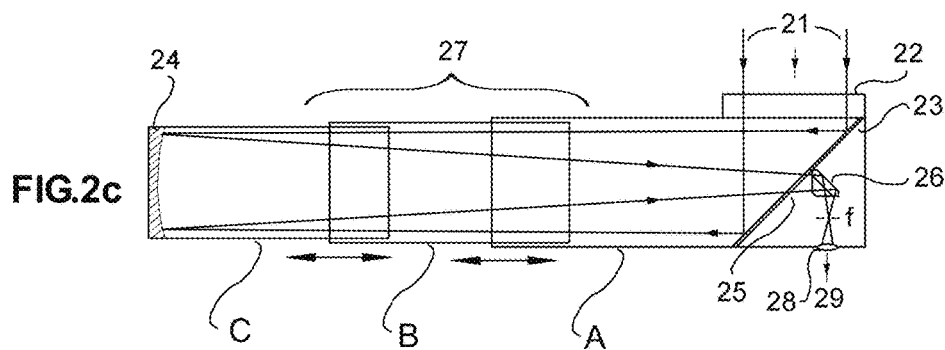
FIG. 2c shows the monocular/telescope of FIG. 1a, 2a focused by adjusting the distance between the primary and eyepiece like a refractive spy-scope.

FIG. 2c shows the same monocular of FIG. 1a, 2a with the focuser 27 being a simple adjustment of the distance between the concave primary mirror 24 and the eyepiece 28 just like a conventional refractive spy-scope. Light 21 entering the aperture of the spy-scope 22 reflects off the flat aperture mirror 23 which redirects the light into the concave primary mirror 24. The light reflects off the primary mirror 24 and back through a small centrally located opening 25 in the flat aperture mirror 23. The focal point of this light f is then behind the flat aperture mirror 23. The light passes through the flat aperture mirror 23 and into the 90° image correcting system 26. After passing through the image correcting system, the image is upright correct and true and the focal point of the primary mirror 24 is both parallel to the incoming light 21 and within the focus range of the eyepiece 28, which allows for "straight-through" seeing. The focuser 27 is the optical tube itself which allows for adjusting the distance between the primary mirror 24 and eyepiece 28 by using a telescoping tube structure, with one section sliding into another. In this example there are three sections A, B, C which slide back and forth to accomplish focusing.

Figure 3A:
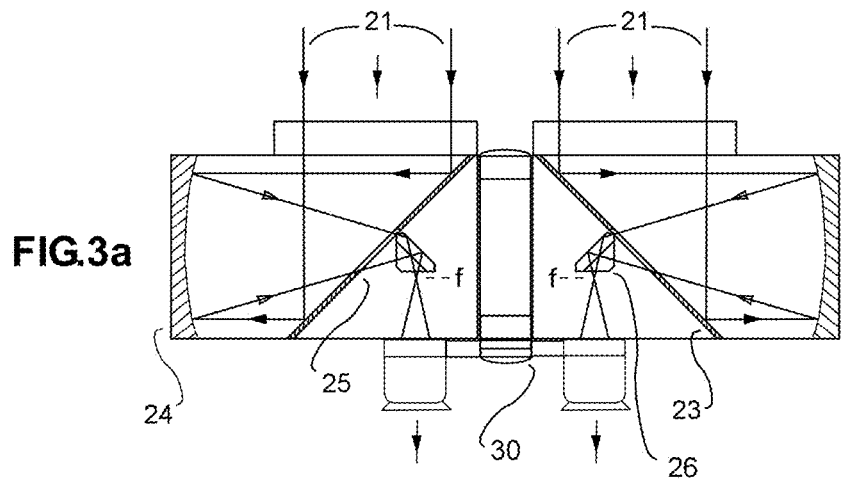
FIG. 3a shows a binocular configuration consisting of the monoculars of FIG. 1a, or 2a, with ability to control interpupillary distance spacing, which results in the smallest footprint for binoculars but sacrifices some light grasp by needing larger central apertures in the flat mirrors.
Figure 3B:
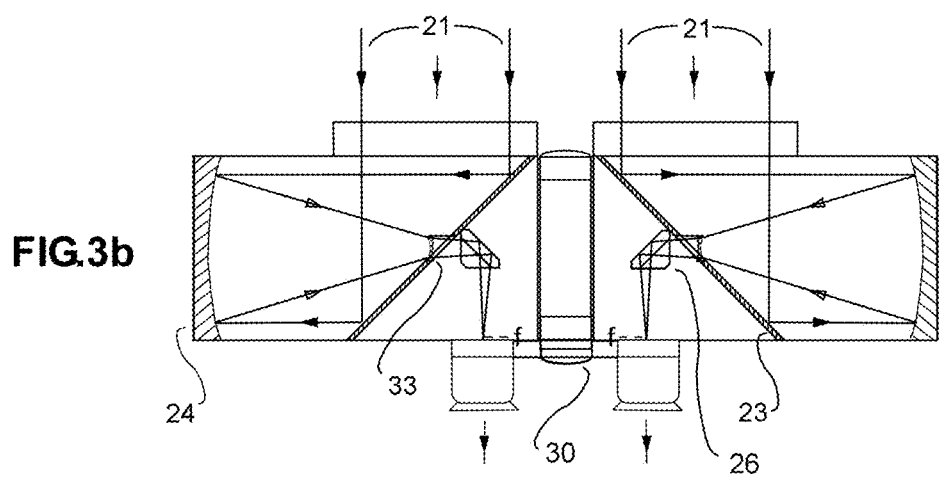
FIG. 3b shows a binocular configuration consisting of the monoculars of FIG. 1b, with ability to control interpupillary distance spacing, which results in a slightly larger footprint for the binoculars but can have smaller central apertures in the flat mirrors.
Figure 3C:
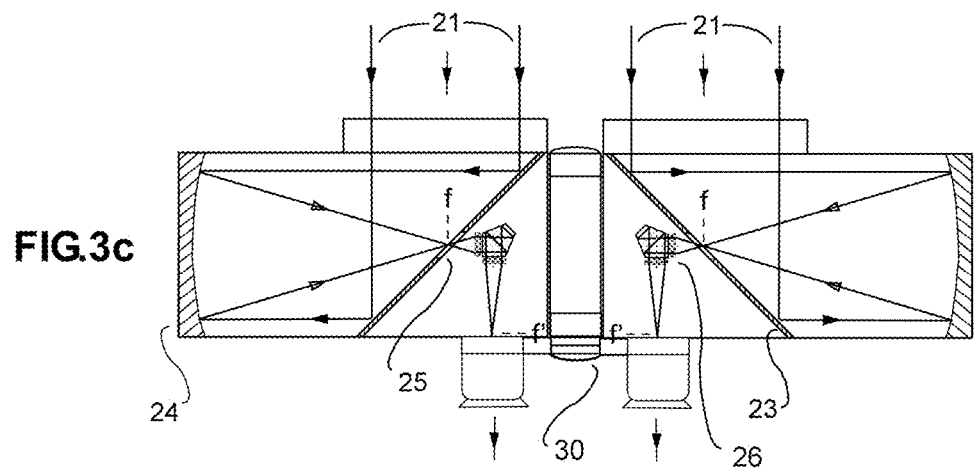
FIG. 3c shows a binocular configuration consisting of the monoculars of FIG. 1c, with ability to control interpupillary distance spacing, which results in an even larger footprint for the binocular but uses the smallest central apertures in the flat mirrors.

FIGS. 3a, 3b, and 3c show possible implementations of reflective binoculars using the monocular designs of FIG. 1a, 1b, 1c, 2a, 2b with each design having certain advantages over the others depending on the required application. All designs show a means to adjust the interpupillary distance 30, as well as a focus means 27, though labeling of all elements within the binoculars has not been done, but are the same as in the monoculars of the previous drawings. This was done to highlight the main differences between the binocular types without undo clutter; the differences being the size (diameter) of the hole 25, required in the flat aperture mirror 23, the type of image correcting means 26, the location of the resulting focal point for viewing f, and the resulting overall size of the instrument. Light baffling or objective optical windows are not shown for the same reasons, but can be added in.

FIG. 3a show a binocular configuration consisting of the monoculars of FIG. 1a, or 2a, 2b, having an interpupillary distance spacing means 30, and a configuration which reduces the image corrector to the minimum parts required; using a prism to upright correct the image for viewing and deflect it by 90°. This design approach represents a trade off. It results in the smallest binocular configuration shown at the expense of requiring a larger hole 25 in the flat aperture mirror to allow the focal point of the primary to reach a point where it can be focused for viewing, which reduces the incoming light grasp slightly as more is blocked out by the hole. It is also the simplest design to manufacture and align at the lowest cost; all significant factors to commercial viability; therefore the benefits may outweigh the slight loss of light. Some of the light loss can also be mitigated by designing such that the focal point is as short as possible, behind the flat aperture mirror and not extending all the way out to the backside edge of the flat mirror, as shown, f. Light 21, enters the binoculars and is reflected by the flat aperture mirrors 23, which redirects the light to the primary mirrors 24, which then converges and passes through the holes 25 in the flat aperture mirrors and then passes through the 90° image correcting means 26, where the focal point is put in range of the focuser 27, for viewing through an eyepiece 28, coming out of the instrument 29, with numbers corresponding to parts listed in the previous monocular drawings.

FIG. 3b shows a binocular configuration consisting of the monoculars of FIG. 1b, having an interpupillary distance spacing means 30, with a diverging lens in the hole of the flat aperture mirror. This helps to minimize the size of the hole required 25, in the flat aperture mirror 23, which limits incoming light loss and reduces any diffraction effects which might otherwise occur when light passes through the hole 25. The image corrector uses a prism to upright correct the image for viewing and deflect it by 90°. This design will also serve to increase the magnification of the device by extending the focal length of the primary mirror. The result is an instrument slightly larger than that shown in FIG. 3a. Light 21, enters the binoculars and is reflected by the flat aperture mirrors 23, which redirects the light to the primary mirrors 24, which then converges and passes through the diverging lenses 30 and then through the holes 25 in the flat aperture mirrors and then passes through the 90° image correcting means 26, where the focal point is put in range of the focuser 27, for viewing through an eyepiece 28, coming out of the instrument 29, with numbers corresponding to parts listed in the previous monocular drawings.

FIG. 3c shows a binocular configuration consisting of the monoculars of FIG. 1c, having an interpupillary distance spacing means 30, with a 90° image correcting lens/prism means 26, which highlights its ability to limit the size of the opening 25 in the flat aperture mirror 23, thus reducing incoming light lost to a minimum. The image corrector 26, uses a converging lens/prism means to upright correct the image for viewing and deflects it by 90°. This design approach results in a slightly larger instrument. Light 21, enters the binoculars and is reflected by the flat aperture mirrors 23, which redirects the light to the primary mirrors 24, which then converges near the holes 25 in the flat aperture mirrors and then passes through the 90° image correcting lens/prism means 26, where the focal point is put in range of the focuser 27, for viewing through an eyepiece 28, coming out of the instrument 29, with numbers corresponding to parts listed in the previous monocular drawings.

FIG. 3d shows how the interpupillary distance can be changed 30 with these reflective binoculars, which is very similar to existing refractive binocular designs. The monoculars are tilted toward or away from each other at the joining hinge point, which moves the eyepieces closer or farther apart. Numbers correspond to parts listed in the previous monocular/binocular drawings.

FIG. 3e shows a 3 dimensional example of what these types of binoculars look like when assembled. The focuser and interpupillary distance spacing is all very similar to what is seen in conventional refractive binocular designs, except these designs can be made less expensive based on the use of reflective mirrors rather than lenses. These designs can also be made to be more compact (shorter), as compared to refractive designs of similar aperture. This shortened stature can make these reflective designs easier to handle than comparative refractive designs due to the weight distribution being closer to the observer. The configuration shown uses dual focus with a single turning knob, with one of the eyepieces adjustable separately, the same as the most common refractive binoculars, but they could also use individual focus adjustment if desired.

Figure 4A:
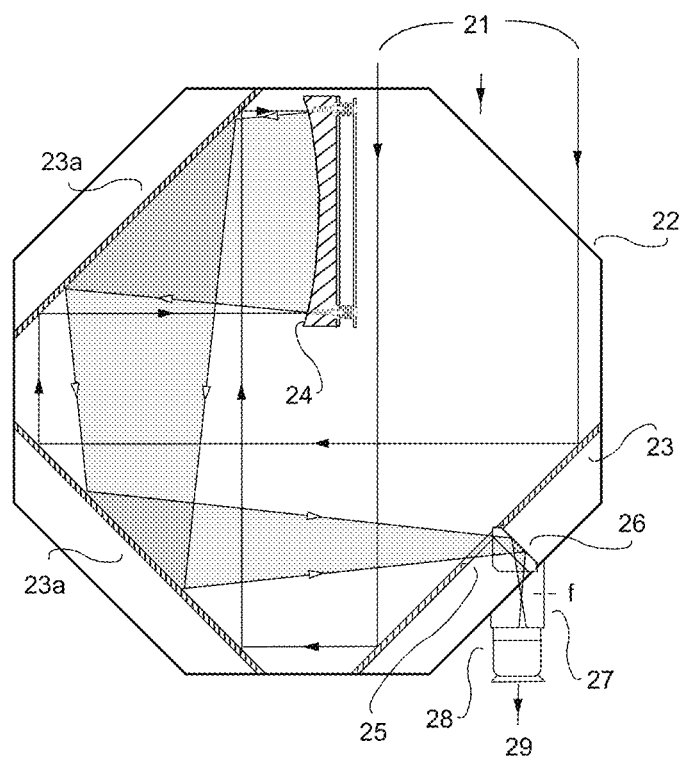
FIG. 4a shows the monocular/telescope of FIG. 1a, with two additional flat mirrors used in a folded optics circular arrangement to minimize the telescope size.
Figure 4A:
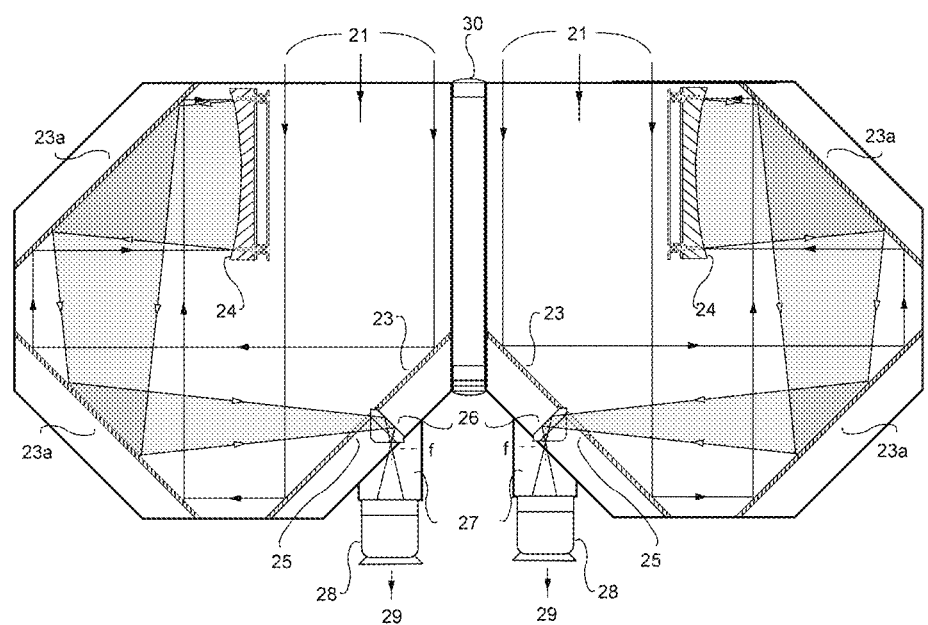

FIG. 4a shows the addition of two flat mirrors 23a, without holes, to the monocular of FIG. 1a. These additional mirrors are used to decrease the overall length of the optical instrument when either much larger or much slower (longer focal length, higher F#) primary mirrors 24 are used. Light 21 entering the aperture of the telescope 22 reflects off the flat aperture mirror 23 which redirects the light into the concave primary mirror 24. The light reflects off the primary mirror 24 and back through a small centrally located opening 25 in the flat aperture mirror 23. The focal point of this light f is behind the flat aperture mirror 23. The light passes through the flat aperture mirror 23 and into the 90° image correcting system 26. After passing through the image correcting system, the image is upright correct and true and the focal point of the primary mirror 24 is now parallel to the incoming light, and within the range for focusing, which allows for "straight-through" seeing. The folding of the optical path makes for a device much easier to handle as it's bended into a shorter, circular path. The ability to maintain "straight-through" seeing is maintained however, no matter how many additional mirrors are added to fold the optics.

FIG. 4aa shows a binocular configuration consisting of the monoculars of FIG. 4a, having an interpupillary distance spacing means 30. Light 21 entering the aperture of the binocular, reflects off the flat aperture mirrors 23 which redirects the light into the concave primary mirrors 24. The light reflects off the primary mirrors 24 and back through small centrally located openings 25 in the flat aperture mirrors 23. The focal points of this light f are behind the flat aperture mirrors 23. The light passes through the flat aperture mirrors 23 and into the 90° image correcting systems 26. After passing through the image correcting systems, the image is upright correct and the focal point of the primary mirror 24 is now parallel to the incoming light, and within the range for focusing, which allows for "straight-through" seeing.

Figure 4B:
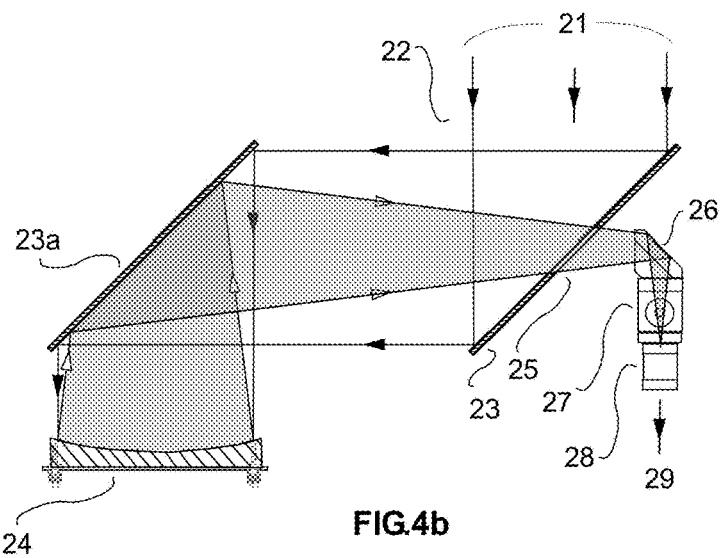
FIG. 4b shows a monocular/telescope configuration similar to FIG. 1a with an additional flat mirror added to redirect the light by 90° to shorten the telescope size.

FIG. 4b shows a monocular/telescope configuration similar to FIG. 1a with an additional flat mirror 23a added to redirect the light by 90° to shorten the telescope size. This type of configuration is useful in larger format binocular configurations.

Figure 4C:
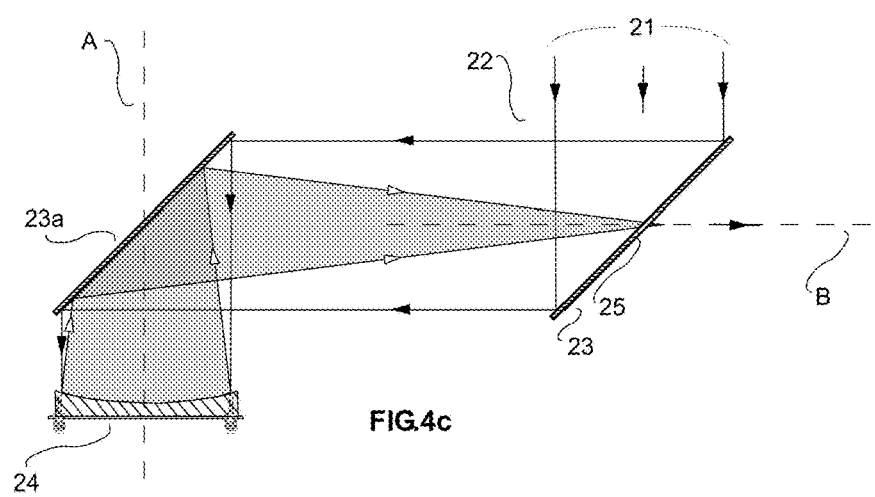
FIG. 4c shows the same monocular/telescope of FIG. 4b, for astronomical use with larger primary mirror or liquid mirror telescope designs that require the primary mirror to remain horizontal in its mount.
Figure 4D:
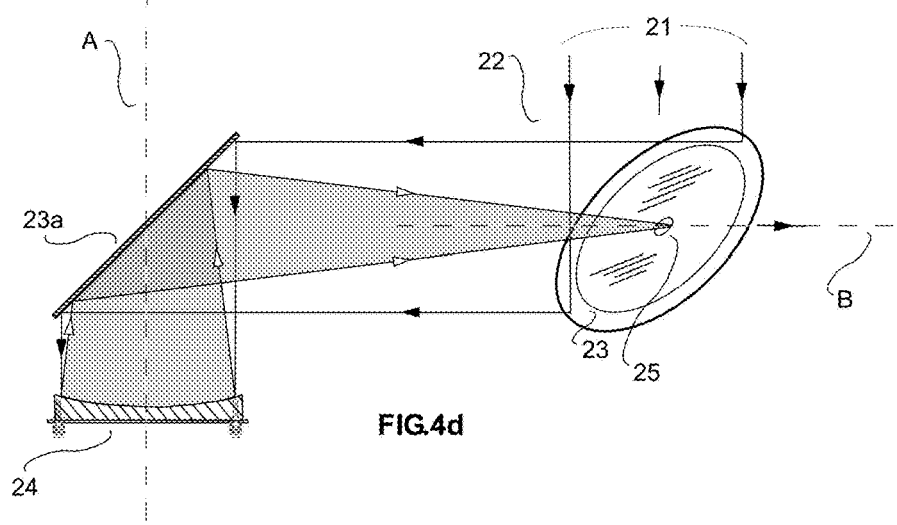
FIG. 4d shows the monocular/telescope of FIG. 4c with the flat aperture mirror rotated about the B-axis to point at visual targets lower in the sky or for terrestrial viewing.

FIG. 4c, 4d can represent a different type of telescope in some respects because in all other configurations of the present invention, the flat mirrors are locked in place and always maintain the same fixed orientation (~45°) and fixed spacing with the other mirrors (with the exception of focusing by moving the primary mirror in night vision applications), but neither is true for the telescope of FIG. 4c, 4d; therefore it can also operate differently because of this.

FIG. 4c shows the same basic monocular configuration of FIG. 4b, but is drawn without the 90° image corrector 26. It is intended for very large primary mirror or liquid mirror telescopes which benefit from the concave primary mirror 24, remaining horizontal at all times. Liquid primary mirrors attain a parabolic shape when rotated; the focal length of the mirror is dependent on how fast the liquid is rotated. Rather than the telescope being pointed toward the target for viewing as in all the other versions of the present invention, this configuration is intended to be operated by rotation about the two axis indicated, A & B. The X, Y coordinate pointing direction (side to side) can be controlled by rotation of the entire telescope about the A-axis or just by adjusting the angle of the flat mirror 23 with central aperture 25. The orientation of the flat mirror 23a, is always the same, sitting at a 45° angle with respect to the horizontal concave primary mirror 24, and serves to direct light in and out of it. This flat mirror can rotate separately about the A-axis above the concave primary mirror 24, or it can be locked to the primary mirror such that they would then rotate about the A-axis together, or it can remain in a fixed position above the primary mirror if the flat mirror 23 alone is used for redirecting viewing light. In the special case of a liquid concave primary mirror, these mirrors, 23a & 24, would not be locked together so the liquid primary could be left undisturbed as the rest of the telescope rotates about the A-axis for directional adjustment or mirror 23 alone is adjusted for that purpose. The Z (up/down) pointing direction is controlled by rotation of the flat aperture mirror 23 about the B-axis. The flat aperture mirror 23 can either maintain a 45° angle with respect to the flat mirror 23a when mirror 23a is free to rotate about the A-axis, or it can tilt to any angle when mirror 23a is fixed. In either case mirror 23a can freely rotate about the B-axis and the spacing between the two mirrors, 23 & 23a, can be varied; the variation is due to a liquid primary mirrors ability to change focal length with changes in rotational speeds. The light path and reflections follow the same paths as those described of FIG. 4b except they may or may not include an image corrector.

FIG. 4d shows the large aperture telescope of FIG. 4c with the Flat aperture mirror 23, pointing slightly toward the side for viewing objects lower in the sky, with the front reflective surface coming out of the page. The design can still use an image corrector as in FIG. 4b, especially if terrestrial viewing is desired. A telescope of this type, if used as an observatory would not require a dome structure since the two flat mirror sections could be designed to fit together to form a closed structure when not in use. It would be a simple matter of allowing the variation in flat mirror spacing for the variable focal length discussed earlier to go from zero (closed) to some maximum focal length.

Figure 5:
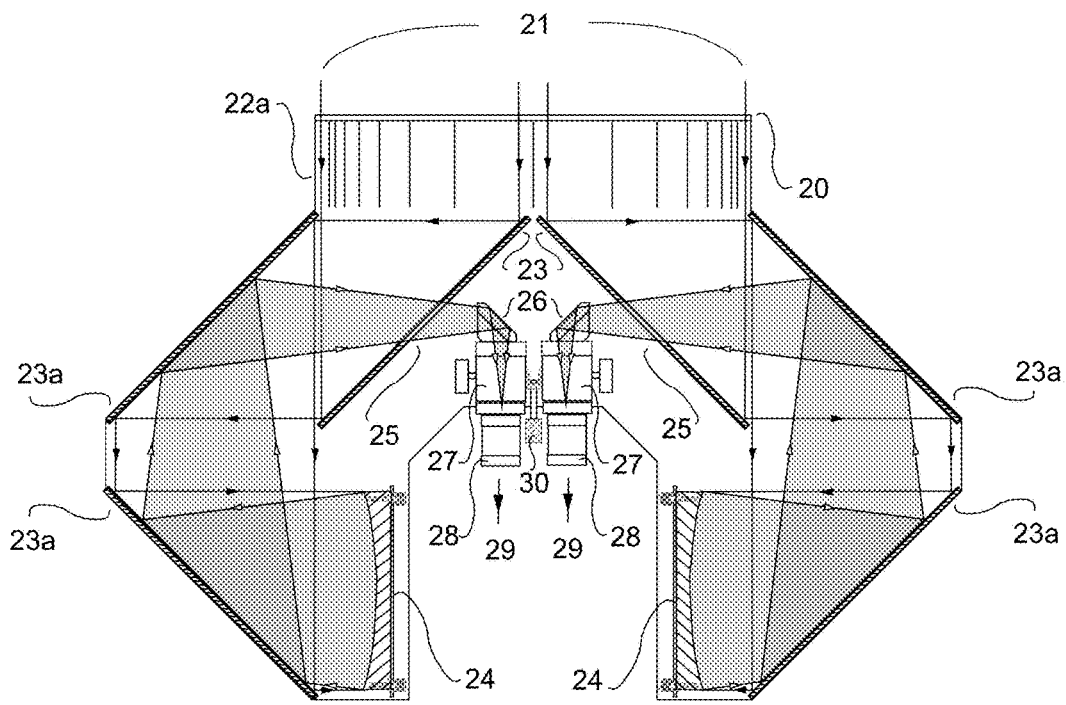
FIG. 5 shows a folded optics binocular configuration consisting of monoculars which are a hybrid configuration of those shown in FIGS. 4a and 4b, on a common platform, which is more suited to large aperture binocular viewing and forms a unique wrap-around design.

FIG. 5 shows the ultimate configuration of a large aperture binocular when folded optics are employed with this type of reflective design. This binocular has many advantages over both refractive and reflective designs. It consists of monoculars which are a hybrid configuration of those shown in FIG. 4a and FIG. 4b, which is more suited to binocular viewing and forms a unique wrap-around design. It still maintains the straight-through seeing of the monoculars in FIGS. 4a & 4b, with each monocular placed on in a common enclosure structure. This allows for much easier alignment of the optics as compared to other reflective designs which typically just combine two Newtonian telescopes. The one piece structure also makes for a much more rugged design since all the optics are locked in place and contacted from all sides by the housing. The optics are not easily knocked out of alignment because of this, which can't be said of most other reflective designs. Interpupillary distance can easily be adjusted 30, either manually or by adding motor control, which shifts each focuser and image correcting means as two separate units, with each image correcting means shifting along with its corresponding focuser. Each monocular half can be independently focused manually, or with electronic motor control, and they can be focused simultaneously, most easily when controlled electronically. Current prototype designs are using stepper motors with a micro-controller which are directed by thumb joysticks on handles under the instrument, but many approaches would be acceptable. This binocular shows the added light baffles in the entry aperture 22a, as well as an optical window 20, which can be added to seal the instrument (enclosing the optics). A device of this type is not only rugged, but the compact size and weight distribution allow for handheld (shoulder mounted) use as well as mounted use on a stand. Considering all other binocular designs (with the exception of those of the present invention), both refractive and reflective, become too large, heavy, and unwieldy for steady operation after aperture size reaches just a few inches, even at low magnification, and that this instrument can be shoulder mounted (hand-held) and operated at apertures at least double that, makes this binocular truly unique. As with all the monocular and binocular configurations shown, light 21, enters the instrument through the aperture opening with vertical light baffles 22(a) and reflects off the flat aperture mirrors 23. If it's a folded optics design like this, it then strikes the first of the two flat mirrors 23a, followed by the second 23a, and then the concave primary mirrors 24. The light is then directed back as shown by the converging lines which enclose a darker gray region, representing the converging light cone, until it reaches the flat aperture mirror 23 again and the cone of light passes through the central holes (apertures) 25 and into the 90° image correcting systems 26. This particular drawing uses the image correcting system of the binoculars of FIG. 3a to simplify and shorten the design as much as possible, but could just as easily have used the image correctors of FIG. 3b or 3c. After passing though the image correcting system the focal point ends up in range of the focusers 27 which are placed well within the area behind the flat aperture mirrors 23, reducing the length of the cone that must pass through and therefore reducing the size of the holes 25 in the flat aperture mirrors 23 as well. The eyepieces 28 are then moved back and forth, either manually, or under electronic control until the desired focus is reach in each eye. If using electronic focusing, both eyes can then be focused at the same time for terrestrial use or independently for astronomical use if desired. This particular drawing shows how the optics can be enclosed by adding an optical window 20 or can improve the stray light characteristics by adding the light baffles to the entry light path 22a.

Figure 5B:
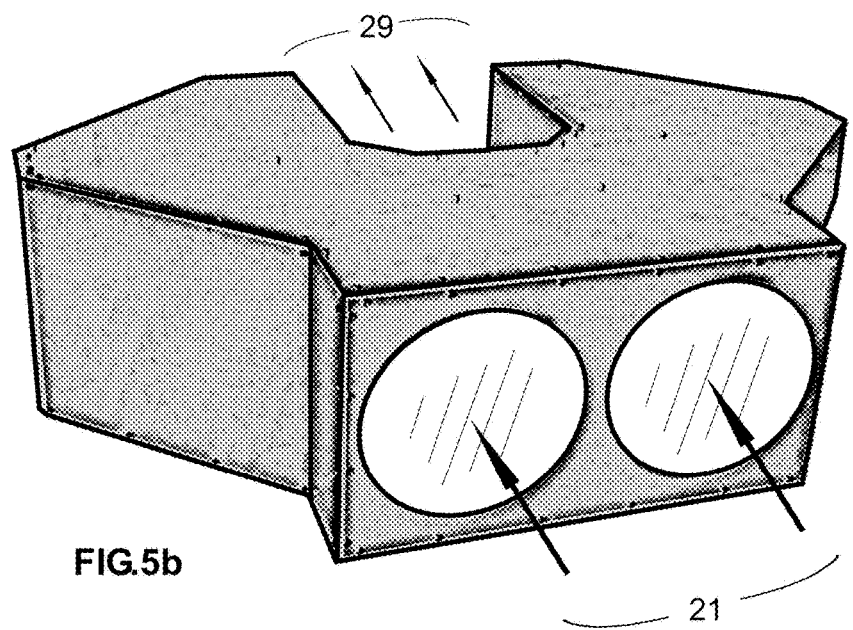
FIG. 5b shows an isometric view of the folded optics binocular of FIG. 5.

FIG. 5b shows a 3-dimensional view of how the binocular of FIG. 5 looks when fully assembled. The electronic control handles would be located on the underside of the instrument if used, but are not shown, and serve a dual purpose as they are also used to help point the device at different potential viewing targets. Many large aperture configuration footprints are possible depending on the focal length and size of the primary mirrors chosen, but they all function the same way and have a similar wrap around approach. This configuration is good for larger optics in the 6"-20" plus range.

Figure 5C:
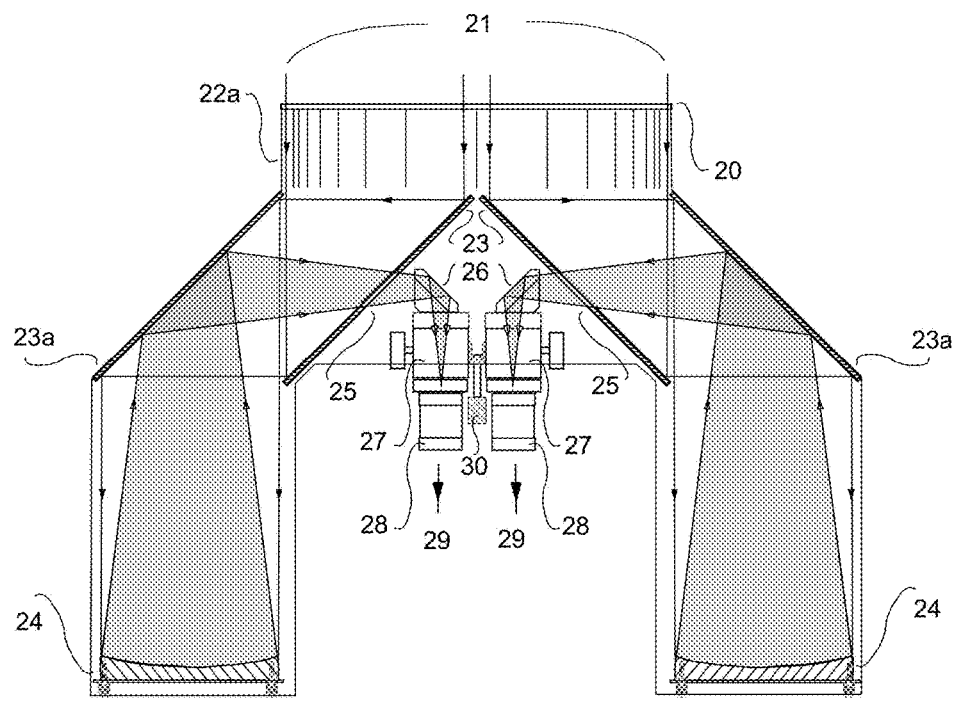
FIG. 5c shows a large aperture binocular consisting of monoculars of FIG. 4b, on a common platform, and forms a unique wrap-around design.

FIG. 5c shows a binocular configuration consisting of the monoculars of FIG. 4b. This type of binocular is intended for moderate size primary mirror designs or designs with shorter focal lengths. Perhaps with apertures in the 3"-6" range; this configuration is typically smaller than that of the binocular in FIG. 5, which will start at 5" or 6" aperture and go up from there. One benefit of a design such as this is that the layout, with the primary's jetting backward over the shoulders of the user, has the effect of stabilizing the binocular to some extent so that larger apertures can still be hand held. This design can also use a shoulder mount as is the case with the binocular of FIG. 5 or use any traditional binocular mount. Operation of this type of binocular is very similar to the operation described for the binocular of FIG. 5, having an interpupillary adjustment means 30, except there will be one less reflection because there is one less flat mirror in each monocular path. Light 21, enters the instrument through the aperture opening with vertical light baffles 22(*a*) and reflects off the flat aperture mirrors 23. It then strikes the flat mirrors 23*a*, and then the concave primary mirrors 24. The light is then directed back as shown by the converging lines which enclose a darker gray region, representing the converging light cone, until it reaches the flat aperture mirror 23 again and the cone of light passes through the central holes (apertures) 25 and into the 90° image correcting systems 26. This particular drawing uses the image correcting system of the binoculars of FIG. 3*a* to simplify and shorten the design as much as possible, but could just as easily have used the image correctors of FIG. 3*b* or 3*c*. After passing though the image correcting system the focal point ends up in range of the focusers 27 which are placed well within the area behind the flat aperture mirrors 23, reducing the length of the cone that must pass through and therefore reducing the size of the holes 25 in the flat aperture mirrors 23 as well. The eyepieces 28 are then moved back and forth, either manually, or under electronic control until the desired focus is reach in each eye.

Figure 5D:
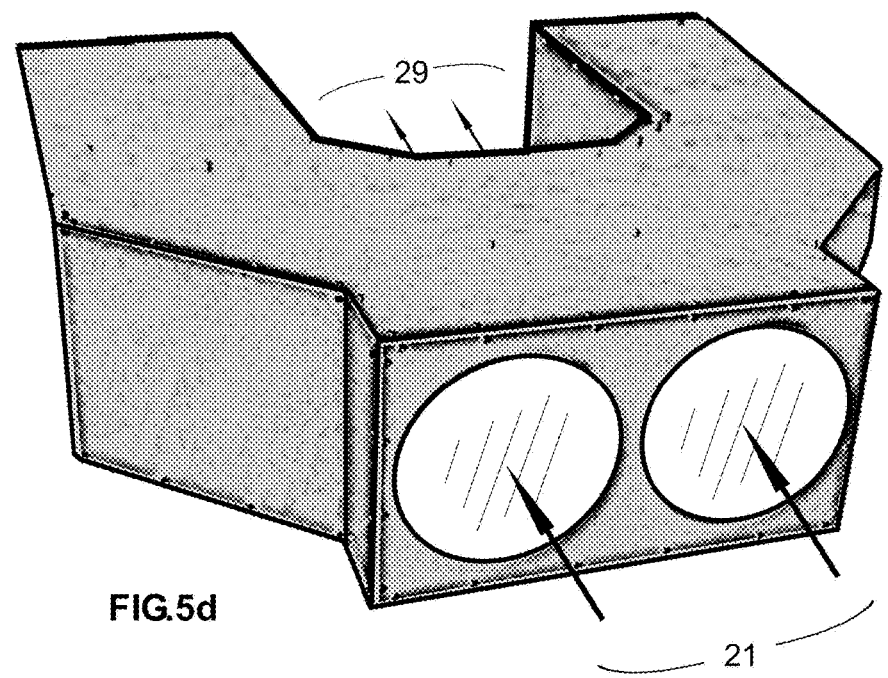
FIG. 5d shows an isometric view of the folded optics binocular of FIG. 5c.

FIG. 5*d* shows a 3-dimensional view of how the binocular of FIG. 5*c* looks when fully assembled. The electronic control handles would be located either on the sides, or underneath the instrument, if used, but are not shown, and serve a dual purpose as they are also used to help point the device at different potential viewing targets.

FIG. 6*a*, 6*b*, 6*c*, 6*d* shows night vision applications using the monocular of the present invention with either an inverting image intensifier 50 or a non-inverting image intensifier 50*a* added to form a part of the 90° image corrector system, 26. These devices require an external power source (not shown).

FIG. 6*a* shows a monocular similar to that of FIG. 1*a* or 2*a*, used in a night vision application, with a non-inverting image intensifier 50*a* inserted just prior to the 90° image corrector 26. Light 21 comes into the device and strikes the flat aperture mirror 23, which redirects the light back to the concave primary mirror 24, which then converges the light to a focus near the hole of the flat aperture mirror 25 on the photocathode portion (front surface) of the image intensifier 50*a*, the output of which is then upright corrected by the 90° image corrector prism 26, and can then be viewed through and eyepiece 28, where it comes out 29. Focusing is done using a focus means 27, which can adjust the spacing between the primary mirror 24 and the image intensifier 50*a*.

FIG. 6*b* shows a monocular similar to that of FIG. 1*b*, used in a night vision application, with a non-inverting image intensifier 50*a* forming a portion of the 90° image corrector 26, using the diverging lens 33 to extend the focal length of the primary mirror 24 through the flat aperture mirror 23 to the input of the image intensifier 50*a*. Light 21 comes into the device and strikes the flat aperture mirror 23, which redirects the light back to the primary mirror 24, which then converges the light where it passes through the diverging lens means 33, which extends the focal length beyond the flat aperture mirror 23 to its backside where it is focused on the photocathode portion (front surface) of the image intensifier 50*a*. Focusing is done by a focus means 27, which can adjust the spacing between the primary mirror 24 and the diverging lens means 33. The output of the image intensifier 50*a* is then upright corrected and offset 90° by a prism means which forms the image corrector 26, which can then be viewed through and eyepiece 28, where it comes out 29.

FIG. 6*c* shows the monocular of FIG. 1*c*, used in a night vision application, with a non-inverting image intensifier 50*a* forming a portion of the 90° image corrector 26. Light 21 comes into the device and strikes the flat aperture mirror 23, which redirects the light back to the concave primary mirror 24, which then converges the light to a focus near the hole of the flat aperture mirror 25, which then passes through the first lens means 26*a* of the 90° image corrector 26, and strikes the photocathode portion (front surface) of the image intensifier 50*a*. Focusing is done by a focus means 27, which can adjust the spacing between the primary mirror 24, and the first lens means 26*a*. The output of the image intensifier is then diverted 90° by a prism means which is also part of the image corrector 26, and passes through the second lens means 26*b*, where it is then upright correct and can be viewed through and eyepiece 28, where it comes out 29.

FIG. 6*d* shows a night vision monocular similar to the monocular of FIG. 6*c*, but using an inverting (upright image correcting) image intensifier 50, and a prism means to form the 90° image corrector 26, rather than using lenses. Light 21 comes into the device and strikes the flat aperture mirror 23, which redirects the light back to the primary mirror 24, which then converges the light where it is focused near the hole 25 in the flat aperture mirror on the photocathode portion (front surface) of the image intensifier 50. Focusing is done by a focus means 27, which can adjust the spacing between the primary mirror 24 and the image intensifier 50. The output of the image intensifier, which is upright correct, is then offset 90° by a prism means which can then be viewed through and eyepiece 28, where it comes out 29.

FIG. 6*e* highlights the focusing means 27 of the monoculars of FIG. 6*a*, 6*b*, 6*c*, 6*d* by changing the position of the primary mirror 24 with respect to the flat aperture mirror 23 and subsequent image intensifier.

FIG. 6*f* shows a binocular/goggle configuration of the night vision device, where in this case two of the monoculars of FIG. 6*d* are combined along with a means for adjusting the interpupillary distance 30. As with FIG. 6*d*, light 21 comes into the goggles and strikes the flat aperture mirrors 23, which redirects the light back to the primary mirrors 24, which then converges the light where it is focused near the holes 25 in the flat aperture mirrors on the photocathode portion (front surface) of the image intensifiers 50. Focusing is done by a focus means 27, which can adjust the spacing between the primary mirrors 24 and the image intensifiers 50. The output of the image intensifiers, which is upright correct, is then offset 90° by prism means which can then be viewed through and eyepieces 28, where it comes out 29.

Figure 7A:
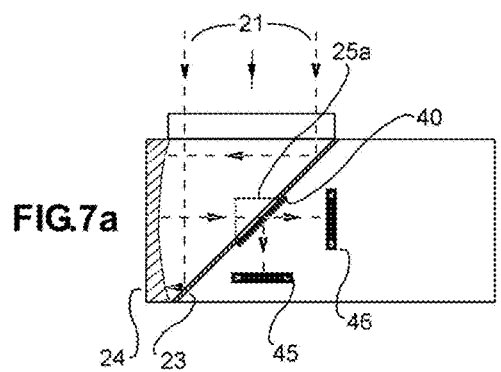
FIG. 7a shows part of a monocular, similar to those of FIG. 1a, 2a, 6c, not showing the image correcting systems, but introduces a beam splitter attached to the back side of the hole in the flat aperture mirror which splits the light cone from the primary mirror into beams separated by 90°, which are then shown upon electrical sensor elements to be used as part of the image correcting system for the purpose of multi-wave or other digital image processing to be performed later.

FIG. 7*a* introduces a new element to the NV monocular design, a beam splitter 40, which splits the light cone from the primary 24 as it passes through the light baffled hole 25*a*, in the flat aperture mirror 23, into two separate cones; one passing directly through and the other being offset by 90°. A general note on the beam splitters chosen for this application is that certain beam splitter will work with the converging light cone without having to first collimate the light and they won't cause chromatic aberration or ghosting of the image, while covering a broad wavelength spectrum. Since the beam splitter attaches in parallel to the flat aperture mirror 23 at the hole 25, which sits at 45° with respect to the light cone from the primary mirror 24, it naturally imparts a 45° angle of incidence with the beam splitter which these types of beam splitters are designed for. These cones of light can then be used to process either two different wavelengths of light with sensors, 45 & 46, which are sensitive to whatever light range is required, or they can also be sensitive to the identical wavelengths so that additional processing can be done. This is the most basic arrangement for a multi-wave Night Vision monocular device using the monoculars of the present invention.

It's worth noting the use of the present invention for multi-wave applications within a single optical system is made possible because light of all wavelengths reflects the same off of mirrors, unlike refractive designs which bend the light different amounts depending on the wavelength; called chromatic aberration; which gives the approach of the present invention a distinct advantage over traditional refractive designs. All these multi-wave night vision devices will require an external power supply (not shown).

Figure 7B:
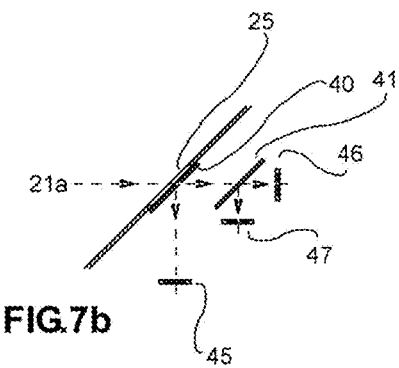
FIG. 7b shows a portion of a monocular similar to that of FIG. 7a with an additional beam splitter added to one side of the previous beam split to facilitate 3 sensor elements.

FIG. 7b shows the same beam splitter 40 of FIG. 7a with an additional beam splitter 41 in one of the two light paths following the initial beam split of the reflected light cone 21a. This can either be the same type of beam splitter or a different type to accommodate different wavelength splitting or different ratios. This configuration would yield three possible sensor or optical wave types to process and combine 45, 46, and 47.

Figure 7C:
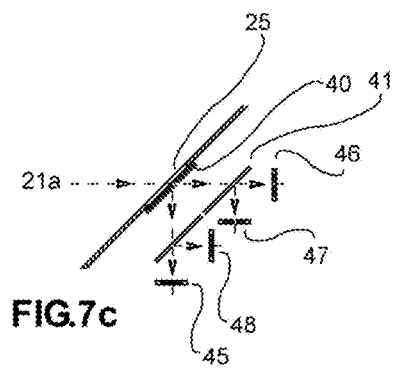
FIG. 7c shows a portion of a monocular similar to that of FIG. 7a with an additional beam splitter added to both sides of the previous beam split to facilitate 4 sensor elements.

FIG. 7c extends the sensors to four (45, 46, 47, 48) by splitting both light beams from that of FIG. 7a using beam splitters 41, which are parallel to the initial beam splitter 40. The light cones are all focused on the available sensors or optical devices, 45-48. They can also be setup so that they all focus at different points in the focal range for the purpose of combining them digitally, such that a greater depth of field can be achieved, perhaps even eliminating the need to focus at all.

Figure 8:
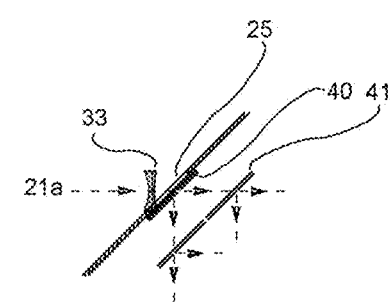
FIG. 8 shows a portion of the monocular stage shown in FIG. 7c with the diverging lens arrangement of the monocular in FIG. 1b use to extend the focal length of the primary mirror past the flat mirror to more easily facilitate beam splitting in order to accommodate multiple sensor elements.

FIG. 8 show the focal length being increased by the divergent lens 33 in the hole 25 of the flat aperture mirror 23. This extends the cones of light farther past this mirror to allow for subsequent beam splitting to accommodate multiple sensors as well as collimating the light more before beam splitting.

Figure 9:
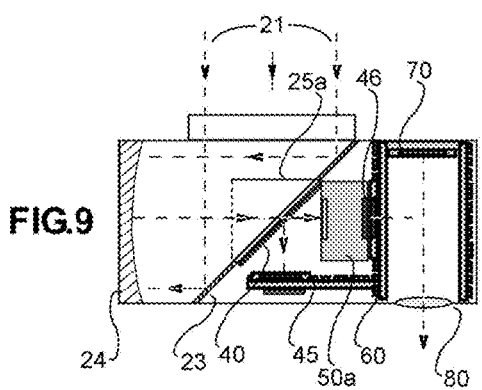
FIG. 9 shows a multi-wave night vision monocular similar to FIG. 1a, 7a, with a single beam split and two digital sensors, along with an image intensifier which forms part of the image correcting system, with electronic circuitry and a digital display, in order to overlap data from both sensors on a common screen.

FIG. 9 shows a typical example of a multi-wave application using the monocular of the present invention, similar to that shown in FIG. 1a. In this case it uses the beam splitter 40 of FIG. 7a to split the beam in two. Light 21 enters the multi-wave monocular and reflects off the flat aperture mirror 23, which directs the light to the concave primary mirror 24, which then reflects the light back through the light baffled hole 25a in the flat aperture mirror 23 where it is then split by beam splitter 40 on the backside of mirror 23. One beam is used as the input to a non-inverting image intensifier 50a, the output of which goes to sensor 46, and the other is used with an IR sensor 45. The two sensors connect to electronic circuitry 60, which combines the images in software and displays a composite image on the digital display 70, to be viewed through the eyepiece/window 80.

Figure 9A:
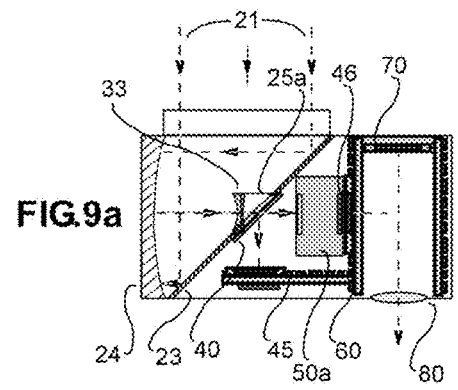
FIG. 9a shows a multi-wave night vision monocular similar to FIG. 1b, which uses part of the section shown in FIG. 8, with a single beam split and two digital sensors, along with an image intensifier which forms part of the image correcting system, with electronic circuitry and a digital display, in order to overlap data from both sensors on a common screen.

FIG. 9a shows a similar monocular multi-wave application using the monocular of the present invention, similar to that shown in FIG. 1b. In this case it uses the diverging lens 33 of FIG. 8 to extend the focal length of the concave primary mirror 24, along with the beam splitter 40 of FIG. 7a to split the beam in two. Light 21 enters the multi-wave monocular and reflects off the flat aperture mirror 23, which directs the light to the concave primary mirror 24, which then reflects the light back through the diverging lens 33 and through the light baffled hole 25a in the flat aperture mirror 23 where it is then split by beam splitter 40 on the backside of mirror 23. One beam is used as the input to a non-inverting image intensifier 50a, the output of which goes to sensor 46, and the other is used with an IR sensor 45. The two sensors connect to electronic circuitry 60, which combines the images in software and displays a composite image on the digital display 70, to be viewed through the eyepiece/window 80.

FIG. 10a illustrates how these night vision monocular and binocular goggle configurations can be mounted to a soldier's helmet in the field, similar to other night vision devices; however, the devices of the present invention are extremely low profile compared to existing refractive designs and this figure bears that out in both active and inactive operational status modes.

FIG. 10b shows these night vision monoculars can be combined for greater field of view (FOV), like other night vision devices, but at much lower profile which is significant for close quarters in urban areas.

FIG. 10c illustrates how multi-wave night vision monocular and binocular goggle configurations can be mounted to a soldier's helmet in the field, similar to other night vision devices; however, the devices of the present invention are extremely low profile compared to existing refractive designs and considerably smaller and lighter.

The operation for all monocular telescope and binocular configurations of the present invention are intended to be very much like that of the operation with a refractive instrument. The extremely rugged configuration of using a flat aperture mirror which contacts the instrument from all sides allows for direct competition between these reflective optical instruments and conventional refractive ones.

The "straight-through" the optics (parallel) seeing along with the internal image correction makes all the configurations of the present invention ideally suited to terrestrial observation, with larger instruments crossing over to astronomical use as well.

Starting with the monoculars of FIG. 1a, 1b, 1c, 2a, 2b, 2c the instrument can either be mounted or hand held depending on the size, magnification, and weight distribution. Some focus means is used to adjust either the eyepiece or the primary mirror (as in a collapsible spy-scope) to allow for clear viewing by an observer. These designs may or may not have light baffling added to reduce stray light, depending on the application. The observer would just point the instrument toward what they wanted to see and then focus the light for a clear view through the eyepiece.

The binoculars of FIG. 3a, 3b, 3c, 3d, 3e, function exactly like conventional refractive binoculars. That is, you would first adjust interpupillary distance spacing by tilting the monocular sections together by rotation at the center mounting hinge where the monoculars are combined. Tilting or rotation does not effect the orientation of the view through these monoculars, unlike many other reflective designs, which makes them easier to use, the product simpler to manufacture, and more cost effective. Next the user would point the instrument in the direction of something they wish to view and use the focuser to achieve clear viewing with both eyes. If the binocular is setup for independent focusing, then each individual eyepiece is focused separately. If only one of the eyepieces can be focused separately as well as both eyepieces together, the observer would first focus on something using the eyepiece that is not independent, and then focus the independent eyepiece to match clarity with the other, and then both eyepieces can be focused simultaneously when viewing objects at different distances.

The folded optics monocular of FIG. 4a is primarily intended for larger telescopes with either longer focal lengths or larger primary mirrors, but can be used for any size telescope or binocular configuration. The intention is to minimize the total dimensions of the instrument as much as possible, being handheld in smaller configurations, such as small scale collapsible (spy-scope like) or binocular designs such as FIG. 4aa. The observer would point the telescope/monocular at what they wanted to see and then use a focus means to clearly view objects at different distances. Binoculars would operate the same except interpupillary distance spacing is adjusted first, like with all binoculars. If a large aperture binocular is built, interpupillary distance spacing would likely be done linearly as is the case with FIGS. 5, and 5c.

The folded optics monocular of FIG. 4b is most likely to be used as part of a binocular arrangement, but would operate the same as that described for FIG. 4a.

The folded optics telescope of FIG. 4c, 4d is intended for telescopes with either very large primary mirrors, or liquid primary mirrors which benefit from the primary mirror remaining horizontal at all times, so operation is somewhat different. Rather then the instrument being pointed at a target for viewing, the telescope can either be rotated about its base (A-axis) for initial direction and then the flat aperture mirror is rotated for elevation to the target, or the primary and flat mirror 23a can stay in a fixed relation to the A-axis and directional changes can be done with the flat aperture mirror 23 alone. Other than that, the user would just adjust the focuser to view the target more clearly. However, if a liquid mirror is being used, there is an additional step. Because a liquid mirror can change the focal length of its primary mirror by rotating faster or slower, the operational procedure would be to first set the focal length (adjust rotational speed), once set, then the spacing between the flat aperture mirror 23 and the other flat mirror 23a would be adjusted so that the focal point of the primary mirror passes through the hole in the flat aperture mirror, such that it is in range for focusing or any other additional processing, which might include adaptive optics deflection behind the flat aperture mirror. Once the focal point is set to the desired distance through the hole in the flat aperture mirror, the operation would then match what was previously described for a fixed focal length mirror.

The folded optics binocular of FIG. 5 is intended for large aperture binoculars which can benefit from combining the monocular telescopes onto a more rigid single platform, which does not tilt and therefore interpupillary spacing would be adjusted in a linear manor, with the eyepieces and internal image correctors moving in a straight line toward or away from each other. This configuration also has a distinct advantage over refractive designs which become extremely expensive and difficult to manufacture as aperture sizes increases beyond about 5", whereas the present invention starts around that aperture size and goes up from there. This particular configuration allows for size and focal length variation and can accommodate extremely large versions of either. Something unique about the configuration compared to refractive designs is its ability to be shoulder mounted (hand-held, resting on the shoulders) up to sizes well beyond what is possible with refractive designs. Although a drawing isn't shown in this application, one can imagine how a wrap around binocular configuration such as this can have a weight distribution such that the weight of the instrument can be supported on top of the shoulders, rather than out in front of the body as a conventional refractive design would be, which in this case would allow an observer to handle much more weight comfortably to allow them to steady the optics for viewing.

This large wrap around binocular can either be designed for electronic focusing, and interpupillary distance spacing, or they can be adjusted manually. Prototype designs used both, with the electronic focusing being done with thumb joystick controls located on handles on the underside of the binocular. This allows for easier observation of terrestrial targets.

To use the large aperture folded optics binocular, first the interpupillary distance spacing is adjusted, either manually or electronically. Then a target is selected, and the instrument is pointed toward and focused upon it independently with each eyepiece, assuming independent dual focusing of the instrument. This can either be done manually or electronically. Once both eyepieces are focused correctly, they can be focused simultaneously on targets at different distances. The simultaneous focusing can be more easily done electronically with stepper motors for exact movement, but the focusing system could also be designed to mechanically operate the same as conventional small scale binoculars if desired. The reason most designs will likely opt for independent focusing of both eyepieces is because the binoculars are large aperture, so they can be a true crossover product, allowing for use in both astronomy and terrestrial observation. Most astronomical use binocular devices choose independent focusing of the eyepieces because the objects being observed are at infinite distance, so there isn't a need for rapid changes in focus as there would be for terrestrial use.

This type of large aperture binocular can be enclosed as shown in FIG. 5b with an optical window added and then filled with an inert gas, such as nitrogen, to prevent the internal optics from fogging, and for possible use in military applications, perhaps onboard ships to replace the smaller objective 5" Big-Eye binoculars currently used since the footprint of a larger aperture instrument of the present invention (6"-8") would be of comparable total length to the 5" Big-Eye refractive binoculars. Additionally, traditional night vision with image intensifiers or multi-wave capability can be added as indicated and implied in FIG. 6-9.

The binoculars of FIG. 5c, 5d function very much the same as the binoculars of FIG. 5, 5b; the folded optics are just arranged in a different configuration to redistribute more weight back behind the shoulders for more stability in hand held applications.

When configured as a night vision monocular, be that single-wave or multi-wave, the observer would likely have the monocular mounted in some way to their head, with the monocular sitting very close to the observers face, oriented anywhere from horizontal to vertical depending on comfort of the observer. The tilting of the monocular will not effect the orientation of the image so whatever tilt downward from horizontal is purely a matter of preference for the user.

FIG. 6a, 6b, 6c, 6d night vision monoculars are all used the same way. They would be mounted, most likely to a helmet as shown in FIG. 10a, powered "off" and flipped up when not active, or powered "on" and flipped down when active. All would use external power supplies (not shown). The observer would use the focus adjustment on the end of the monocular to adjust for visual clarity for objects at different distances, by movement of the primary mirror with respect to the image intensifier (similar in some respects to spy-scope focusing). These are extremely low profile configurations as compared to current night vision technology, so would be more effective for military use than current technology. They are also extremely rugged, as are all the monoculars of the present invention due to the secondary flat aperture mirror being secured on all sides by the device housing. This makes them more suited to use in this application than any other reflective type of design.

FIG. 6f night vision binocular/goggles would function very much the same way as the night vision monoculars just discussed. The interpupillary distance spacing can be handled in a number of different ways. For FIG. 6f this is accomplished the same as a traditional binocular with the two monocular tubes being tilted together or apart as needed to reach the desired spacing of the eyepieces, but they could just as easily use a linear adjustment method. FIG. 10a shows how a binocular/goggle could also be designed to be used as a monocular for either eye or both if desired. This would be to provide some flexibility for missions depending on the operational situation. The configuration of the current invention also makes wider fields of view possible.

The multi-wave night vision monoculars of FIG. 9, 9a, using any of the front end configurations of FIG. 7-8, or the multi-wave binocular/goggle of FIG. 10c, would all operate in a similar manner as the night vision optics of FIG. 6a, 6b, 6c, 6d, 6f. The user would power the device "on", flip it down in front of the user's eye(s), adjust the focus using the focusers on the ends of the tubes and operate hands free while on mission, occasionally refocusing as necessary for different distances. The main difference between the operation of these multi-wave devices verses those of FIG. 6a, 6b, 6c, 6d, 6f, is that since there are multiple images at different wavelengths, the images can either be overlapped or viewed independently so there would likely be a button to select which mode of operation is active. These multi-wave devices have distinct advantages over other multi-wave devices which generally require the use of separate optical elements, to prevent chromatic aberrations, which in those cases the images are then combined digitally and usually result in some ghosting due to the combination of separate unique systems; whereas the present invention uses one set of optics for all wavelengths combined, making combinations easier to perform, with no ghosting of the images, or chromatic aberration. Additionally, device footprints are reduced significantly due to the use of the common reflective optics. Not only can multiple wavelengths be combined or viewed individually, but the same wavelengths could be combined, when focused at different focal lengths, to produce an image with infinite depth of field, eliminating the need for focusing all together. The configuration of the current invention also makes wider fields of view possible due to fast primary mirrors.

When configured as a spotting scope, a zoom mechanism would be added to the image corrector, but use would be the same as any other spotting scope. The instrument is pointed in the direction the observer wishes to see and a focusing means is then used to focus images and a zoom adjustment is done to zoom in or out.

When configured as a rifle scope, a folded configuration is likely used and a zoom mechanism could be added to the image corrector when variable magnification is desired. Use would be the same as a conventional rifle scope. The instrument is pointed in the direction the observer wishes to see, with some zoom/focus adjustment if desired and the ability to make micro-adjustments up or down to the direction the scope is pointing.

General note for all configurations of the present invention; the devices will be more rugged than most other reflective optics designs, they will be less expensive than comparable sized refractive designs, they can be more compact when folded optics is employed for easier storage and use, they will outperform many other reflective designs because they can be setup to block less light to the primary mirror, and the diffraction characteristics of light passing through the hole verses light passing around a mirror in the light path results in higher overall contrast performance. The present invention also has distinct capability advantages over all other types of competing optical designs, particularly when concerning the very large aperture binoculars for hand held (shoulder mounted) use, and night-vision and multi-wave optical use. All viewing angles or positions of the monoculars/binoculars of the present invention yield upright correct images for terrestrial as well as astronomical use.

I claim:

1. A vision assist device comprising:
    a monocular;
    said monocular including,
        an aperture for receiving light;
        a flat mirror having a front reflective surface, a back surface, and a central aperture,
        a concave mirror having a focal point located on a side of said flat mirror corresponding to said back surface of said flat mirror,
        said flat mirror being at an angle such that the light received by said aperture is reflected by said flat mirror to strike a reflective surface of said concave mirror,
        said concave mirror being positioned such that the light striking said reflective surface of said concave mirror is reflected from said reflective surface of said concave mirror to create concave mirror reflected light, said concave mirror reflected light passing through said central aperture of said flat mirror,
        an offset angle image correcting prism located on said side of said flat mirror corresponding to said back surface of said flat mirror, and
        an eyepiece located on the side of said flat mirror corresponding to said back surface of said flat mirror;
    said offset angle image correcting prism upright correcting said concave mirror reflected light;
    said offset angle image correcting prism redirecting said concave mirror reflected light by an offset angle such that said concave mirror reflected light is directed to pass through said eyepiece;
    said monocular further including a diverging lens located within said central aperture of said flat mirror, said concave mirror reflected light passing through said diverging lens.

2. The vision assist device of claim 1, wherein said eyepiece has a first axis and said aperture has a second axis, said first axis being parallel to said second axis.

3. The vision assist device of claim 1, wherein said monocular includes a second flat mirror, said second flat mirror being without a central aperture,
    said second flat mirror being located on a side of said flat mirror corresponding to said front surface of said flat mirror such that the light reflected by said flat mirror strikes said second flat mirror and is reflected by said second flat mirror to said concave mirror;
    said concave mirror reflected light being reflected by said second flat mirror before passing through said central aperture of said flat mirror.

4. The vision assist device of claim 1, wherein said monocular includes an optical window located in said aperture.

5. The vision assist device of claim 1, wherein said monocular includes light baffles located in said aperture.

6. The vision assist device of claim 1, further comprising:
a second monocular; and
said second monocular including,
  an aperture for receiving light;
  a flat mirror having a front reflective surface, a back surface, and a central aperture,
  a concave mirror having a focal point located on a side of said flat mirror corresponding to said back surface of said flat mirror,
  said flat mirror being at an angle such that the light received by said aperture is reflected by said flat mirror to strike a reflective surface of said concave mirror,
  said concave mirror being positioned such that the light striking said reflective surface of said concave mirror is reflected from said reflective surface of said concave mirror to create concave mirror reflected light, said concave mirror reflected light passing through said central aperture of said flat mirror,
  an offset angle image correcting prism located on said side of said flat mirror corresponding to said back surface of said flat mirror, and
  an eyepiece located on the side of said flat mirror corresponding to said back surface of said flat mirror:
an interpupillary distance spacing mechanism located between said monocular and said second monocular.

7. The vision assist device of claim 2, further comprising:
a second monocular; and
said second monocular including,
  an aperture for receiving light;
  a flat mirror having a front reflective surface, a back surface, and a central aperture,
  a concave mirror having a focal point located on a side of said flat mirror corresponding to said back surface of said flat mirror,
  said flat mirror being at an angle such that the light received by said aperture is reflected by said flat mirror to strike a reflective surface of said concave mirror,
  said concave mirror being positioned such that the light striking said reflective surface of said concave mirror is reflected from said reflective surface of said concave mirror to create concave mirror reflected light, said concave mirror reflected light passing through said central aperture of said flat mirror,
  an offset angle image correcting prism located on said side of said flat mirror corresponding to said back surface of said flat mirror, and
  an eyepiece located on the side of said flat mirror corresponding to said back surface of said flat mirror;
an interpupillary distance spacing mechanism located between said monocular and said second monocular.

8. The vision assist device of claim 3, further comprising:
a second monocular; and
said second monocular including,
  an aperture for receiving light;
  a flat mirror having a front reflective surface, a back surface, and a central aperture,
  a concave mirror having a focal point located on a side of said flat mirror corresponding to said back surface of said flat mirror,
  said flat mirror being at an angle such that the light received by said aperture is reflected by said flat mirror to strike a reflective surface of said concave mirror,
  said concave mirror being positioned such that the light striking said reflective surface of said concave mirror is reflected from said reflective surface of said concave mirror to create concave mirror reflected light, said concave mirror reflected light passing through said central aperture of said flat mirror,
  an offset angle image correcting prism located on said side of said flat mirror corresponding to said back surface of said flat mirror, and
  an eyepiece located on the side of said flat mirror corresponding to said back surface of said flat mirror;
an interpupillary distance spacing mechanism located between said monocular and said second monocular.

9. The vision assist device of claim 3, further comprising:
a second monocular; and
said second monocular including,
  an aperture for receiving light;
  a flat mirror having a front reflective surface, a back surface, and a central aperture,
  a concave mirror having a focal point located on a side of said flat mirror corresponding to said back surface of said flat mirror,
  said flat mirror being at an angle such that the light received by said aperture is reflected by said flat mirror to strike a reflective surface of said concave mirror,
  said concave mirror being positioned such that the light striking said reflective surface of said concave mirror is reflected from said reflective surface of said concave mirror to create concave mirror reflected light, said concave mirror reflected light passing through said central aperture of said flat mirror,
  an offset angle image correcting prism located on said side of said flat mirror corresponding to said back surface of said flat mirror, and
  an eyepiece located on the side of said flat mirror corresponding to said back surface of said flat mirror;
an interpupillary distance spacing mechanism located between said flat mirrors with central apertures of said monocular and said second monocular.

10. The vision assist device of claim 4, further comprising:
a second monocular; and
said second monocular including,
  an aperture for receiving light;
  a flat mirror having a front reflective surface, a back surface, and a central aperture,
  a concave mirror having a focal point located on a side of said flat mirror corresponding to said back surface of said flat mirror,
  said flat mirror being at an angle such that the light received by said aperture is reflected by said flat mirror to strike a reflective surface of said concave mirror,
  said concave mirror being positioned such that the light striking said reflective surface of said concave mirror is reflected from said reflective surface of said concave mirror to create concave mirror reflected light, said concave mirror reflected light passing through said central aperture of said flat mirror, an offset angle image correcting prism located on said side of said flat mirror corresponding to said back surface of said flat mirror, and an eyepiece located on the side of said flat mirror corresponding to said back surface of said flat mirror;

an interpupillary distance spacing mechanism located between said monocular and said second monocular.

11. The vision assist device of claim 5, further comprising:

a second monocular; and said second monocular including, an aperture for receiving light;

a flat mirror having a front reflective surface, a back surface, and a central aperture, a concave mirror having a focal point located on a side of said flat mirror corresponding to said back surface of said flat mirror, said flat mirror being at an angle such that the light received by said aperture is reflected by said flat mirror to strike a reflective surface of said concave mirror, said concave mirror being positioned such that the light striking said reflective surface of said concave mirror is reflected from said reflective surface of said concave mirror to create concave mirror reflected light, said concave mirror reflected light passing through said central aperture of said flat mirror, an offset angle image correcting prism located on said side of said flat mirror corresponding to said back surface of said flat mirror, and an eyepiece located on the side of said flat mirror corresponding to said back surface of said flat mirror:

an interpupillary distance spacing mechanism located between said monocular and said second monocular.

12. The vision assist device of claim 9, wherein said second monocular includes a second flat mirror, said second flat mirror being without a central aperture, said second flat mirror being located on a side of said flat mirror corresponding to said front surface of said flat mirror such that the light reflected by said flat mirror strikes said second flat mirror and is reflected by said second flat mirror to said concave mirror;

said concave mirror reflected light being reflected by said second flat mirror before passing through said central aperture of said flat mirror.

13. The vision assist device of claim 1, wherein said monocular includes an image intensifier device located between said back surface of said flat mirror and said offset angle image correcting prism.

14. The vision assist device of claim 6, wherein said monocular includes an image intensifier device located between said back surface of said flat mirror and said offset angle imam correcting prism.

15. The vision assist device of claim 3, wherein concave mirror is a liquid mirror with a variable focal length determined by speed of rotation;

a distance spacing between said flat mirror and said liquid mirror being variable to accommodate the variable focal length of said liquid mirror;

said liquid mirror rotating horizontally.

16. A multi-wave vision assist device comprising:

a monocular;

said monocular including, an aperture for receiving light;

a flat mirror having a front reflective surface, a back surface, and a central aperture, a beam splitter located near said central aperture in said flat mirror, electrical sensor elements located on a side of said flat mirror corresponding to said back surface of said flat mirror, a concave mirror having a focal point located on a side of said flat mirror corresponding to said back surface of said flat mirror, said flat mirror being at an angle such that the light received by said aperture is reflected by said flat mirror to strike a reflective surface of said concave mirror, said concave mirror being positioned such that the light striking said reflective surface of said concave mirror is reflected from said reflective surface of said concave mirror to create concave mirror reflected light, said concave mirror reflected light passing through said beam splitter;

said beam splitter dividing said concave mirror reflected light into two, said electrical sensor elements receiving said concave mirror reflected light passing through said beam splitter said monocular further including a focusing device for focusing said concave mirror reflected light passing through said beam splitter on said electrical sensor elements;

said monocular further including a 90° image correcting device located on said side of said flat mirror corresponding to said back surface of said flat mirror;

said 90° image correcting device digitally combining images data received from said electrical sensor elements;

said monocular further including an electrical display to display digitally combined image data received from said 90° image correcting device;

said monocular further including a diverging lens located within said central aperture of said flat mirror, said concave mirror reflected light passing through said diverging lens.

17. The multi-wave vision assist device of claim 16, further comprising:

a second monocular;

said second monocular including, an aperture for receiving light;

a flat mirror having a front reflective surface, a back surface, and a central aperture, a beam splitter located near said central aperture in said flat mirror, electrical sensor elements located on a side of said flat mirror corresponding to said back surface of said flat mirror, a concave mirror having a focal point located on a side of said flat mirror corresponding to said back surface of said flat mirror, said flat mirror being at an angle such that the light received by said aperture is reflected by said flat mirror to strike a reflective surface of said concave mirror, said concave mirror being positioned such that the light striking said reflective surface of said concave mirror is reflected from said reflective surface of said concave mirror to create concave mirror reflected light, said concave mirror reflected light passing Through said beam splitter;

said monocular and said second monocular being connected such that interpupillary spacing can be adjusted.

18. A monocular/telescope comprising:

a flat Mirror with a central aperture, a concave mirror, one or more flat mirrors without central apertures, where images which strike said flat mirror with central aperture will be redirected by said flat mirror(s) without central apertures before striking said concave mirrors reflective surface, where said concave mirror focal point will be redirected by said flat mirror(s) without central apertures before passing through opening in said flat mirror central aperture, an offset angle image correcting means located on the back side of said flat mirror with central aperture, where said image correcting means upright corrects, and redirects said concave mirror focal image by said offset angle and puts it on a common axis with a viewing means located behind said flat mirror with central aperture, where said concave mirror is a liquid mirror with variable focal length determined by speed of rotation, where the distance spacing between said flat mirror with central aperture and said liquid mirror can be variable to accommodate variable focal length of said liquid mirror, where said liquid mirror rotates horizontally, where said additional flat mirrors and said flat mirror with central aperture may rotate or move independently from said liquid mirror.

* * * * *